United States Patent
Gauger et al.

(10) Patent No.: US 9,202,374 B2
(45) Date of Patent: *Dec. 1, 2015

(54) EVENT WARNING SYSTEM AND METHOD THEREOF

(71) Applicant: Proxisafe Ltd., Victoria (CA)

(72) Inventors: Derek K. Gauger, San Diego, CA (US); Christopher R. Coldwell, Victoria (CA); Thomas D. Heath, Calgary (CA)

(73) Assignee: PROXISAFE LTD., Victoria, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,908

(22) Filed: Jan. 3, 2014

(65) Prior Publication Data

US 2014/0159888 A1 Jun. 12, 2014

Related U.S. Application Data

(63) Continuation of application No. 13/106,121, filed on May 12, 2011, now Pat. No. 8,648,709.

(60) Provisional application No. 61/333,933, filed on May 12, 2010.

(51) Int. Cl.

| G08B 1/08 | (2006.01) |
|---|---|
| G08G 1/0962 | (2006.01) |
| F16P 3/14 | (2006.01) |
| F16P 3/16 | (2006.01) |
| G08B 21/02 | (2006.01) |
| B66F 9/075 | (2006.01) |
| B66F 17/00 | (2006.01) |

(52) U.S. Cl.
CPC ............ *G08G 1/0962* (2013.01); *B66F 9/0755* (2013.01); *B66F 17/003* (2013.01); *F16P 3/14* (2013.01); *F16P 3/147* (2013.01); *F16P 3/16* (2013.01); *G08B 21/0275* (2013.01)

(58) Field of Classification Search
None
See application file for complete search history.

(56) References Cited

U.S. PATENT DOCUMENTS

| 2003/0151508 | A1* | 8/2003 | Frame ........................... 340/540 |
| 2004/0148039 | A1* | 7/2004 | Farchmin et al. ............... 700/79 |
| 2008/0084317 | A1* | 4/2008 | Gakhar et al. ............. 340/573.4 |
| 2008/0186166 | A1* | 8/2008 | Zhou et al. ............... 340/539.13 |
| 2009/0082949 | A1* | 3/2009 | Petrie et al. .................... 701/119 |
| 2010/0289662 | A1* | 11/2010 | Dasilva et al. ............. 340/686.6 |

FOREIGN PATENT DOCUMENTS

JP 08237637 A * 9/1996

* cited by examiner

*Primary Examiner* — Brian Zimmerman
*Assistant Examiner* — Kevin Lau
(74) *Attorney, Agent, or Firm* — Kegler Brown Hill & Ritter; James J. Pingor

(57) ABSTRACT

An event warning system is provided. The innovation can provide real time, personalized and meaningful alert warnings to either or both a machine operator/driver and pedestrians who are in harm's way, or are potentially approaching harm's way. Different from generic warnings such as backup alarms and flashing lights, the innovation's personalized alarm and notification functionality minimizes alarm complacency and maximizes their effectiveness.

22 Claims, 31 Drawing Sheets

| No. | Alert Zone | Movement | Static Zone | Cicada State | HEX Code | Code Name | Red LED | Yellow LED | White LED | Horn | Strobe | Ignition |
|---|---|---|---|---|---|---|---|---|---|---|---|---|
| 1 | Clear | Static / Moving | Clear | Normal | 0xE0 | clear | Off | Off | Off | Off | Off | Enable |
| 2 | Clear | Static / Moving | All | Pessimistic | 0xE1 | cirep | Off | Off | Pessimistic | Off | Off | Enable |
| 3 | Driver Unposted | All | All | All | 0xE2 | unpos | Off | Off | Unposted | Off | Off | Enable |
| 4 | Driver Paced | All | All | All | 0xE3 | pac | Off | Paced | Paced | Off | Off | Enable |
| 5 | Clear | Static / Moving | Intersection | Normal | 0xE3 | intersection | Off | Off | Pessimistic | Intersection | Off | Enable |
| 6 | Clear | Static / Moving | Intersection | Pessimistic | 0xE4 | intersectcirep | Off | Off | Pessimistic | Intersection | Off | Enable |
| 7 | Red | Static | All | Normal | 0xE4 | sedstatic | Blinking | Off | Off | Off | On | Disable |
| 8 | Red | Static | All | Pessimistic | 0xE5 | redcirep | Blinking | Off | Off | Off | On | Disable |
| 9 | Clear | Overspeed | Clear | Normal | 0xF5 | overspeed | Off | Off | Overspeed | Off | Off | Enable |
| 10 | Clear | Overspeed | Clear | Pessimistic | 0xE6 | overspeedcirep | Off | Off | Pessimistic | Off | Off | Enable |
| 11 | Clear | Overspeed | Intersection | Normal | 0xE6 | overspeedintersection | Off | Off | Overspeed | Intersection | Off | Enable |
| 12 | Clear | Overspeed | Intersection | Pessimistic | 0xE7 | overspeedintersectcirep | Off | Off | Pessimistic | Intersection | Off | Enable |
| 13 | Yellow | Moving | Clear | Normal | 0xF7 | yellowmoving | Off | Blinking | Off | Off | Off | Enable |
| 14 | Yellow | Moving | Clear | Pessimistic | 0xE7 | yellowmovingcirep | Off | Blinking | Pessimistic | Off | Off | Enable |
| 15 | Yellow | Overspeed | Clear | Normal | 0xE8 | overspeedyellow | Off | Blinking | Overspeed | Off | Off | Enable |
| 16 | Yellow | Overspeed | Clear | Pessimistic | 0xE9 | overspeedyellowcirep | Off | Blinking | Pessimistic | Off | On | Enable |
| 17 | Yellow | Moving | Intersection | Normal | 0xEA | yellowmovingintersection | Off | Blinking | Off | Intersection | Off | Enable |
| 18 | Yellow | Moving | Intersection | Pessimistic | 0xFD | yellowmovingintersectcirep | Off | Blinking | Pessimistic | Intersection | Off | Enable |
| 19 | Yellow | Overspeed | Intersection | Normal | 0xEA | overspeedyellowintersection | Off | Blinking | Overspeed | Intersection | Off | Enable |
| 20 | Yellow | Overspeed | Intersection | Pessimistic | 0xFA | overspeedyellowintersectcirep | Off | Blinking | Pessimistic | Intersection | Off | Enable |
| 21 | Red | Moving | All but intersection | Normal | 0xEB | redmoving | Blinking | Off | Off | Off | On | Enable |
| 22 | Red | Moving | Intersection | Pessimistic | 0xFB | redmovingcirep | Blinking | Off | Off | Off | On | Enable |
| 23 | Red | Moving | Intersection | Normal | 0xEC | redmovingintersection | Blinking | Off | Off | Intersection | On | Enable |
| 24 | Red | Moving | Intersection | Pessimistic | 0xFC | redmovingintersectcirep | Blinking | Off | Pessimistic | Intersection | On | Enable |
| 25 | Any | Under | Speed limiting ON | Any | 0xF1 | uspeedlimit | DNA | DNA | DNA | DNA | DNA | DNA |
| 26 | Any | Unkty | Speed limiting OFF | Any | 0xF2 | offspeedlimit | DNA | DNA | DNA | DNA | DNA | DNA |

*Additional Signals:*

Open Strobe: 30ms on, once
Supervisor Override: blink white and yellow LEDs 150ms on / 1350ms off, repeat, strobe on, ignition enabled, sleer and activate all alerts not associated with the white and yellow LEDs unless otherwise noted
Out of Radio Signal (2.4 GHz): Pessimistic white LED alert, field lost alert before reaching this state
Speed Governor: Close relay and add closed upon a usf1 Open relay upon a usf2 and hold open

*Alert Definitions:*

| Device | Indication | Definition |
|---|---|---|
| Red LED | Red Zone | 100ms on, 100 ms off, repeat |
| Yellow LED | Yellow Zone | 150ms on, 150 ms off, repeat |
| White LED | Pessimistic | 150ms on, 1350ms off, repeat |
| White LED | Overspeed | 250ms on, 250ms off, repeat |
| W&Y LED | Paced | 300ms on, 300ms off, repeat once |
| W&Y LED | Unposted | Single 300ms flash |
| Horn | Intersection | 333ms seconds on, 333ms seconds off, 333ms seconds on |
| Strobe | | Continuously on |

| Comments |
|---|
| |

FIG. 28

| | | | Alerts Sent to Humans | |
|---|---|---|---|---|
| No. | Alarm | Code Name | HEX Code | Alert | Notes |
| 1 | At startup | None | None | Audible - Low | on 150ms then off |
| 2 | Clear to Neutral | Clear | 0xE0 | None | Clear all alerts |
| 3 | Enter Exit Zone | Exit | 0xE1 | Audible Low | 88 dBA at 6 in. / On 150ms, off 100 ms, repeat 4 times then a single 150ms beep every 30 sec. |
| 4 | In Red Zone | Red | 0xE2 | Audible - Med | 88 dBA at 6 in. / On 250ms, off 250ms, on 250ms, off 750ms, repeat |
| 5 | In Red Zone | Red | 0xE3 | Audible - Low | 85 dBA at 6 in. / On 250ms, off 250ms, on 250ms, off 750ms, repeat |
| 6 | In Red Zone | Red | 0xE4 | Vibrating | On for 1 second, off for 0.5 seconds |
| 7 | In Red Zone | Red | 0xE5 | Audible - High | 91 dBA at 6 in. / On 250ms, off 250ms, on 250ms, off 750ms, repeat |

FIG. 29

EVENT WARNING SYSTEM AND METHOD THEREOF

CROSS-REFERENCE TO RELATED APPLICATIONS

This application is a Continuation of pending U.S. patent application Ser. No. 13/106,121 entitled "EVENT WARNING SYSTEM AND METHOD THEREOF" and filed May 12, 2011 which claims the benefit of U.S. Provisional Patent application Ser. No. 61/333,933 entitled "EVENT WARNING SYSTEM AND METHOD THEREOF" and filed May 12, 2010. The entireties of the above-noted applications are incorporated by reference herein.

BACKGROUND

Safety in warehouses, factories and even big box stores is an issue of importance to manufacturers, workers, employers, employees, customers, bystanders and even insurance companies. Today, there are over 680,000 forklift accidents annually in the United States of America. Forty percent of these accidents, or 272,000 accidents, involve pedestrians. Of these nearly 100,000 are accidents result in injury, and sometimes death.

A typical cost to the employer is over $400,000 per serious injury, in direct costs. However, there are numerous "soft" costs including down time, lost productivity, time required to investigate accidents, low morale, and negative publicity within the company and in the community—and with customers.

There is a need in the art to continue to address workplace accidents and to reduce effective risks associated therewith. Companies that brand themselves and their customers as companies who put worker safety at the forefront tend to be increasingly more successful in the marketplace.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods that include or employ safety products for manufacturing, warehouse and big box retailer facilities, among others. As described supra, dangerous and deadly forklifts account for 680,000 accidents annually in the United States alone; 40% of these (272,000) involve pedestrians. Many of these accidents are potentially life threatening or can cause permanent disability. With forklifts typically weighing more than 15,000 pounds, they are unforgiving to strikes with humans. Significant blind spots, the inability to control safe driving habits, and the lax requirements for driver certification all lead to this epidemic level problem in facilities where they are used.

The innovation, as disclosed and claimed herein can provide personalized and meaningful alert warnings to either or both a forklift drivers and the pedestrians who are in harm's way, or are potentially approaching harm's way. Different from generic warnings such as backup alarms and flashing lights, the innovation's personalized alarm and notification functionality minimizes alarm complacency and maximizes their effectiveness.

In aspects, the system works by precisely monitoring the real time (or near real time) position of machinery (e.g., forklifts) and pedestrians. The system can draw imaginary warning (e.g., yellow) and danger (e.g., red) zones around the forklift which can dynamically change size and shape based on the nature of the movement of the forklift. When a pedestrian comes within a defined zone, alerts can be sent to both the pedestrian and the forklift operator to alert of an encroachment.

In the case of a non-moving forklift, the system can disable the forklift from moving. For example, until the forklift is "paired" with an authorized operator's tag, the forklift can be immobilized. Once successfully "paired," the machinery can be rendered operable.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 28 illustrates example machine device firmware in accordance with aspects of the innovation.

FIG. 29 illustrates an example firmware chart in accordance with aspects of the innovation.

DETAILED DESCRIPTION

Figure 1:
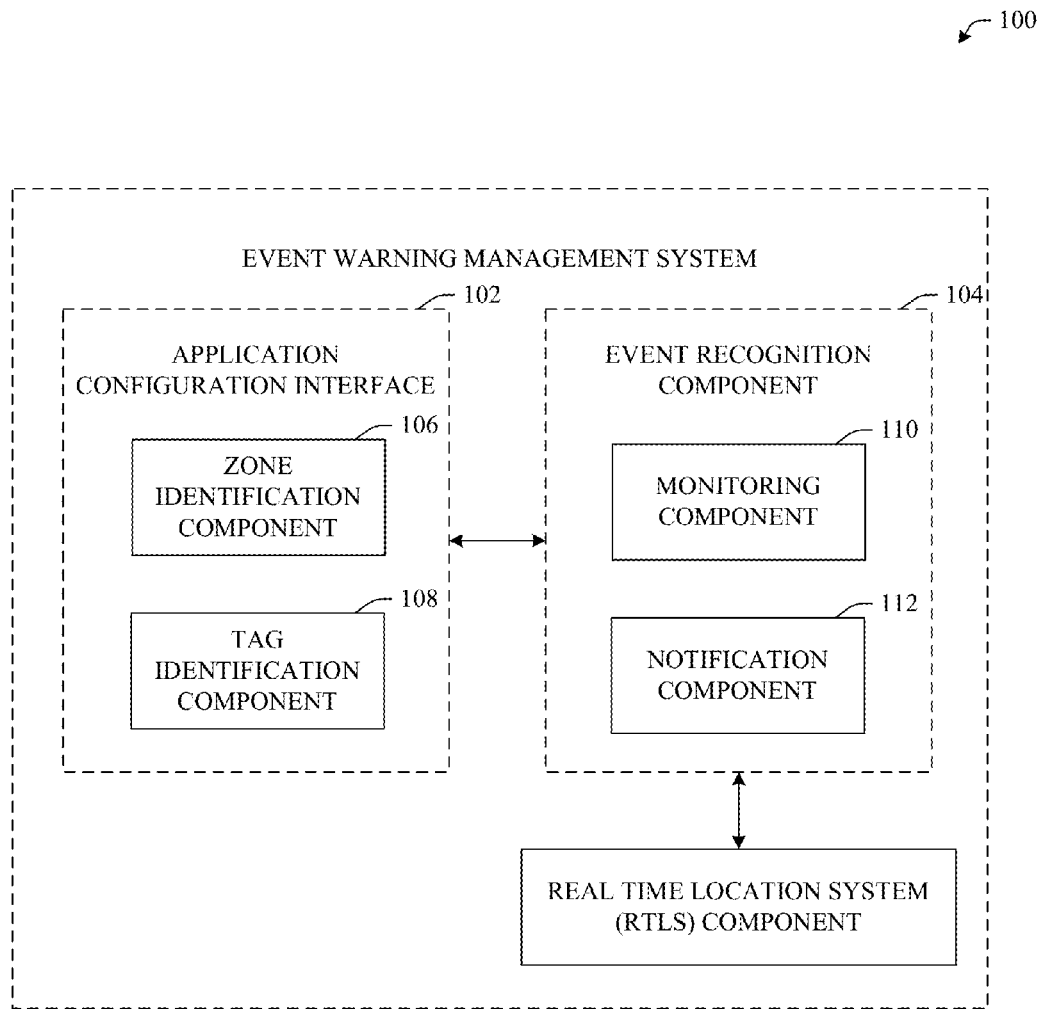
FIG. 1 illustrates an example system that facilitates event warning management in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As described above, industrial and other workplace accidents are expensive for employers and companies. Increased insurance premiums, lost time makeup hours (e.g., usually overtime), and governing board fines can result in hundreds of thousands of dollars in expense. As will be understood, for larger facilities (over 150 employees), it is not uncommon for fines and increased insurance premiums to total over $400 k for a serious injury accident. Everyday injuries continue to occur; the innovation discloses systems and methods that can minimize these accidents and injuries using sophisticated technology and simple easy to understand alarms. As a result, it will be understood that the innovation can save lives and alleviate injuries thereby saving companies related injury and downtime expenses.

Referring initially to the drawings, FIG. 1 illustrates an event warning system 100 that can actively and dynamically monitor movements and locations of assets in a workplace environment, such as a factory, warehouse, big box store, etc. As used herein, an "asset" is intended to refer to machinery, humans, inventory or the like. Although many of the examples described herein are directed to monitoring a forklift in relation to humans, it is to be understood that most any asset can be tracked, for example, individually or in relation to other assets as described. These alternatives are to be included within the scope of the disclosure and claims appended hereto. Similarly, while specific communications networks and technologies are described, it is to be understood that the features, functions and benefits of the innovation can be used in connection with other communication modalities without departing from the spirit and/or scope of the innovation disclosed and claimed herein. Thus, these alternatives are to be included within the scope of this specification.

Generally, the event warning management system 100 can include an application configuration interface 102 and an event recognition component 104. In operation, these components 102, 104 enable the event warning system 100 that is capable of monitoring and tracking assets within an environment to alleviate and/or eliminate events (e.g., accidents, collisions) that can cause injury, disruption, etc. As will be described, a variety of zones can be defined either proactively or reactively (e.g., dynamic) configure the event warning systems. Similarly, authorizations can be assigned, granted or otherwise established to further enable logic into the systems described herein. These and other aspects will be better understood upon a review of the figures and accompanying text that follows.

Essentially, the system 100 describes a supplemental safety system (e.g., active accident avoidance system or "active eyes" system) that, in aspects, can provide a warning signal to both individuals and to operators of machinery when they have entered into a prescribed designated (e.g., dangerous) zone proximate to machinery or vehicles, e.g., that can injure or kill the workers. In particular aspects, the equipment will be a forklift or other material handling vehicle in a factory or warehouse application or a transport or delivery truck in other applications such as, but not limited to, logistics centers, construction sites, or oil and gas operations. It is to be appreciated that the innovation may also be employed in connection with dangerous stationary equipment or entries to dangerous and/or restricted zones or any other zone prescribed by the management (or otherwise defined) of the site where it is installed.

As illustrated in FIG. 1, the application configuration interface component 102 can include a zone identification component 106 and a tag identification component 108. The zone identification component 106 can enable a user to proactively define zones within a facility. For example, "red" zones can be proactively defined. Additionally, the zone identification component 106 can dynamically adjust zones, for example, as a machine moves, enters an intersection, etc. These and other examples will be described in greater detail infra.

The tag identification component 108 enables tags to be assigned or otherwise identified (or associated) within the system. Here, a tag can be recognized to be associated to most any asset, e.g., machinery, worker, etc. As will be understood, in addition to identity of an asset, the tags can also be associated to and assigned authorizations or "rights" associated therewith. For example, a tag can enable or permit a person to enter a particular zone, to operate a piece of machinery, etc. Similarly, a machines tag can recognize and enable a particular person to operate it. As well, the machine's tag can govern speed, turn rate, etc. based upon location, operator, etc.

As shown in FIG. 1, the event recognition component 104 can include a monitoring component 110 and a notification component 112. The monitoring component 110 can monitor, or track, a number of tags individually or in relation to other tags or zones. It is to be appreciated that the monitoring component 110 tracks in real time (or near real time). As will be understood upon a review of the below, the monitoring component 110 can communicate to the notification component 112 to provide an alert or other notification of position, e.g., warning, entry into a zone, imminent danger, etc. As will be understood, the alert can be provided in most any modality including, but not limited to, vibratory, audible, visual, etc. Further, the warnings can be received via a specialized device, e.g., lightbar. In other aspects, warnings can be received via cell phone, smartphone or the like.

As described herein, in aspects, the system works by monitoring (e.g., tracking) the positions of humans and moving (or stationary) machinery (such as forklifts) in real time, via the monitoring component 110. In the preferred embodiment, each human and machine is enabled with a small Ultra Wide Band (UWB) radio (e.g., tag) that can continually transmit a signal that categorizes identity (e.g., name of person, forklift number, machine identification, etc.). The issuance can be effected by way of the tag identification component 108.

Figure 2:
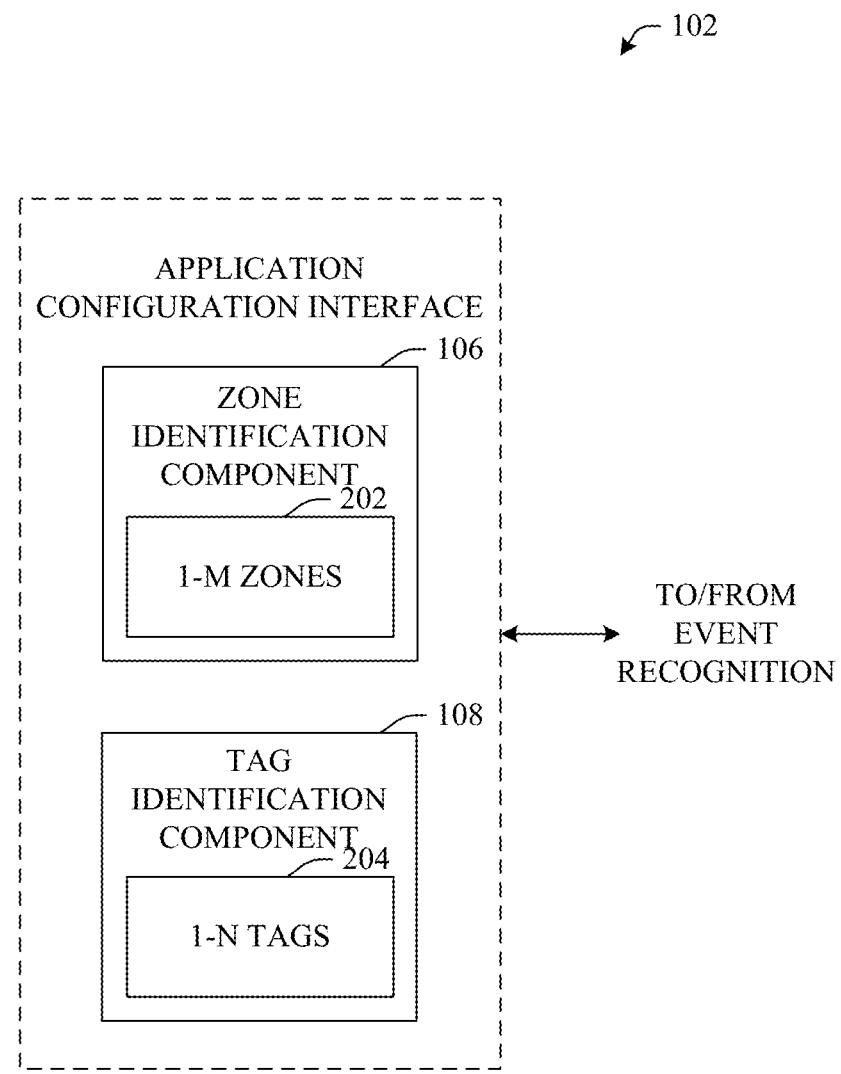
FIG. 2 illustrates an example application configuration interface component in accordance with aspects of the innovation.

FIG. 2 illustrates an alternative example of an application configuration interface component 102 in accordance with the innovation. As shown in FIG. 2, the zone identification component 106 can be employed to establish 1-M zones, where M is an integer. The tag identification component 108 can be employed to identify or otherwise assign 1-N tags, where N is an integer.

Figure 3:
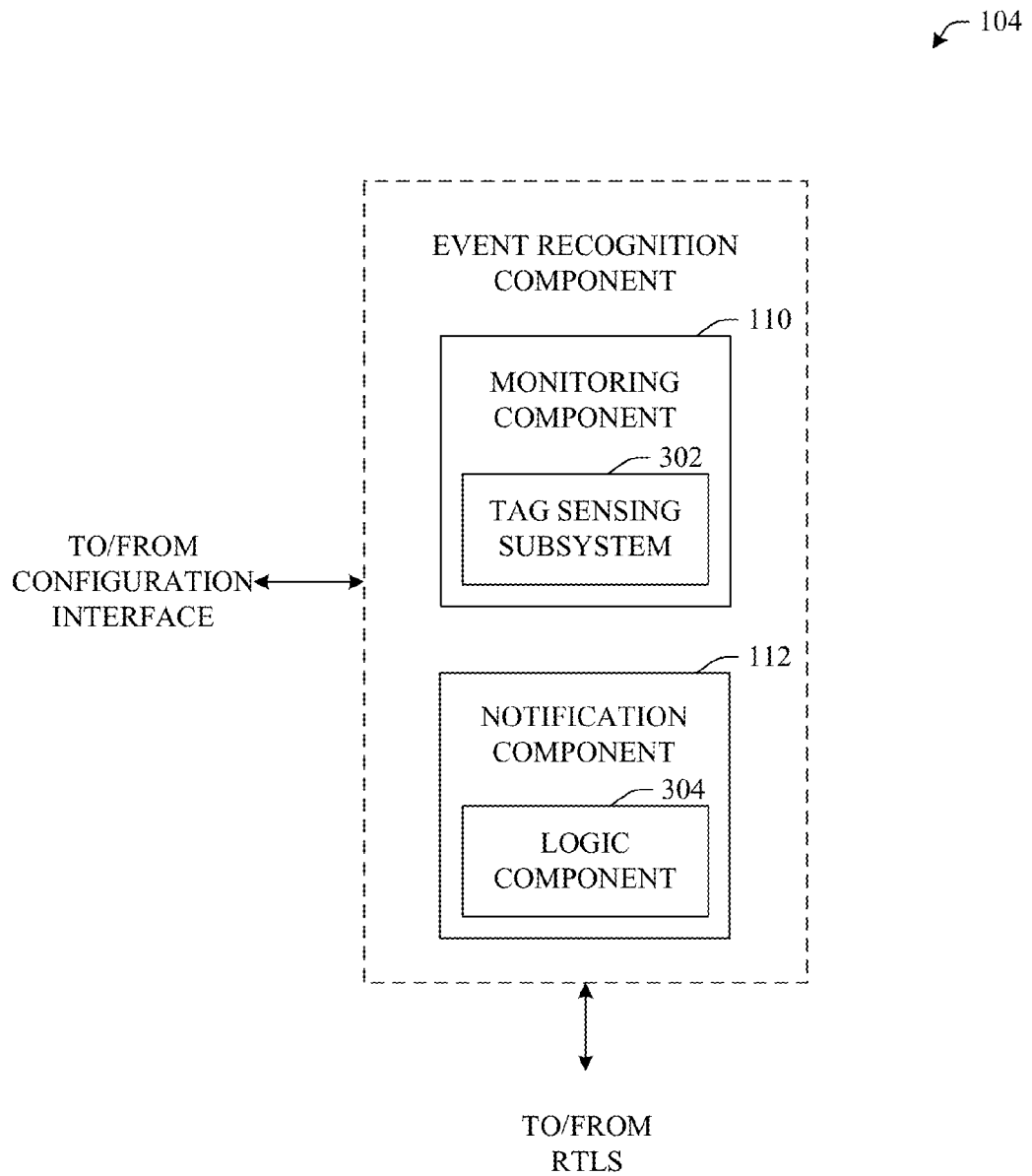
FIG. 3 illustrates an example event recognition component in accordance with aspects of the innovation.

As shown in FIG. 3, the event recognition component 104 can include a tag sensing subsystem 302 capable of tracking and monitoring tags in real time. The tag sensing subsystem 302 can include most any number of sensors capable of establishing a grid or zone as appropriate. The notification component 112 can include a logic component 304 that processes data received via the monitoring component 110 in order to produce and render an appropriate notification or alert. Additionally, the logic component 304 can effect other appropriate action (or inaction) such as rendering a piece of machinery motionless, slowing a machine, controlling turn radius, etc.

In operation, in aspects, the radios (or tags) transmit (e.g., 2-8 times per second) to RTLS sensors which are installed in a grid pattern overhead in the facility. A sensor grid can be arranged in a number of cells (or zones) in the facility. The sensors can detect angle of arrival (AOA) and each cell's master sensor calculates time difference of arrival (TDOA) between the sensors that the UWB radio is in contact with. One sensor within a cell is deemed the master sensor; the master sensor calculates the precise location of each UWB radio in a triangulation type positioning system or real time location system (RTLS) and communicates it to a server via Ethernet (wired or wireless); the server interprets the data and performs calculations dynamically to determine whether alarms should be sent to the shop floor; there is both a location server as well as an event warning server or system. In alternative aspects, these servers can be integrated into a single server as appropriate.

Typically, UWB RTLSs are used for asset tracking such as for tracking inventory and the locations of material handling equipment. It is to be appreciated that, though originally developed for high speed wireless data transmission, UWB provides a low power drain, small, and extremely accurate location platform (e.g., 15-30 cm precision). It should be appreciated that any RTLS system can be used with the innovation's system but UWB type RTLS systems are typically more accurate that other RTLS types. The system can further include components that communicate to and from the location generating components to determine whether alarms to humans and forklifts are appropriate for the given physical and/or dynamic situation on the shop floor.

As described above, companies can, via zone identification component 106, be able to design their own shapes and sizes of dangerous zones (e.g., around a dangerous area or piece of machinery). If a human enters a prescribed zone, the system, which communicates to and from the RTLS software with, typically, an API (application programmable interface), instructs the RTLS software (e.g., via notification component 112) to send a signal to that human and to the machine operator indicating the situation. It does this through a communications channel already existing on the RTLS that operates at 2.4 GHz. In this aspect, the communications channel and the UWB channel are separate. It should be appreciated that other data communication means are possible to send alert codes and other data types to the tags and radios on the assets.

The system 100 is programmed with many provisions that minimize false warnings that oftentimes cause workers to become complacent, e.g., to notifications such as back up beeping alarms on heavy equipment. Additionally, this type of real time tracking of events provides a base for additional product enhancements for future releases such as accident recreation, driver habits reporting, vehicle-to-vehicle accident predictions, automatic time sheets, job time accounting, etc.

The innovation, including RTLS, communicates on, typically, a dedicated Ethernet. Since the size of the data transmissions coming from and going to the sensor network is quite small whereby a master sensor in each cell calculates the position of each UWB radio, some applications may use existing installed networks. Sensors can be wired (or wirelessly connected) to POE switches for data sharing and transmission and can be wired (or wirelessly connected) to each other within a cell and from cell-to-cell to enable precise timing sharing within and between cells. The innovation and RTLS servers receive data to and from the POE switches. It is to be appreciated that the innovation includes both wired and wireless solutions in aspects. Additionally, other office machines, handheld devices, and intranet/Internet devices may interface with the system such as for monitoring shop floor activity as well as for loading of new UWB radios (e.g., tags) in the system. Examples of networking and wiring are described in more detail infra. Note that the system can be operational without the use of the RTLS server and can operate on a standalone basis. In some aspects, an RTLS server is employed for system set up and calibration purposes.

The functionality of the RTLS system includes a sophisticated positioning system that includes components having hardware, networking, and/or software (both on the server and on the physical devices). Actual position data is calculated by the master sensor in each cell and then is transmitted over the network to the servers. It will be appreciated that all or a subset of this functionality can be incorporated into the event recognition component 104 in lieu of a separate, and optional, RTLS server.

The RTLS component is typically configured in cells to keep the calculation and data overhead minimal and the response time high. Typically, cell boundaries are determined by physical attributes in the facility as all of the UWB transmissions must be in the line of sight to the sensor and are blocked by thick walls and metal objects common in manufacturing facilities. Cells typically have a minimum of 4 sensors and can contain up to 12 sensors.

Figure 4:
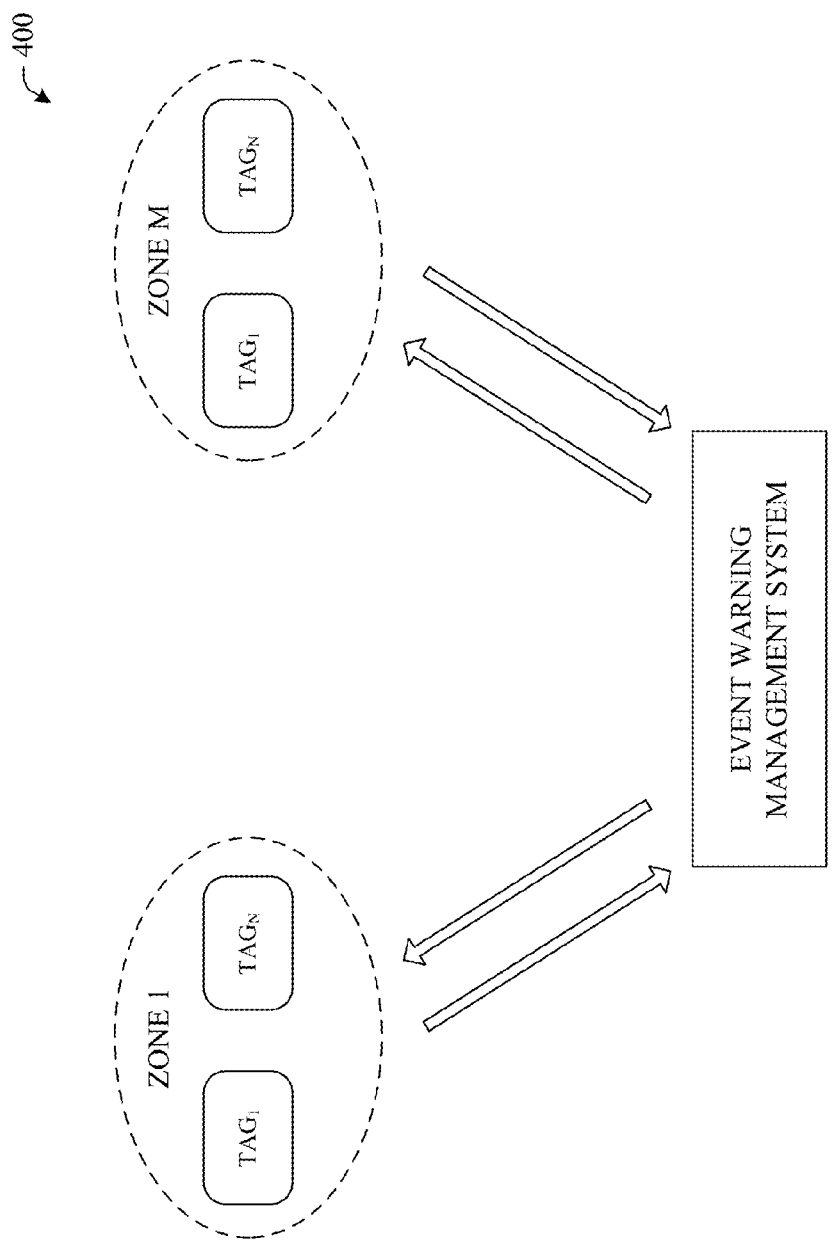
FIG. 4 illustrates an example system environment in accordance with aspects of the innovation.
Figure 5:
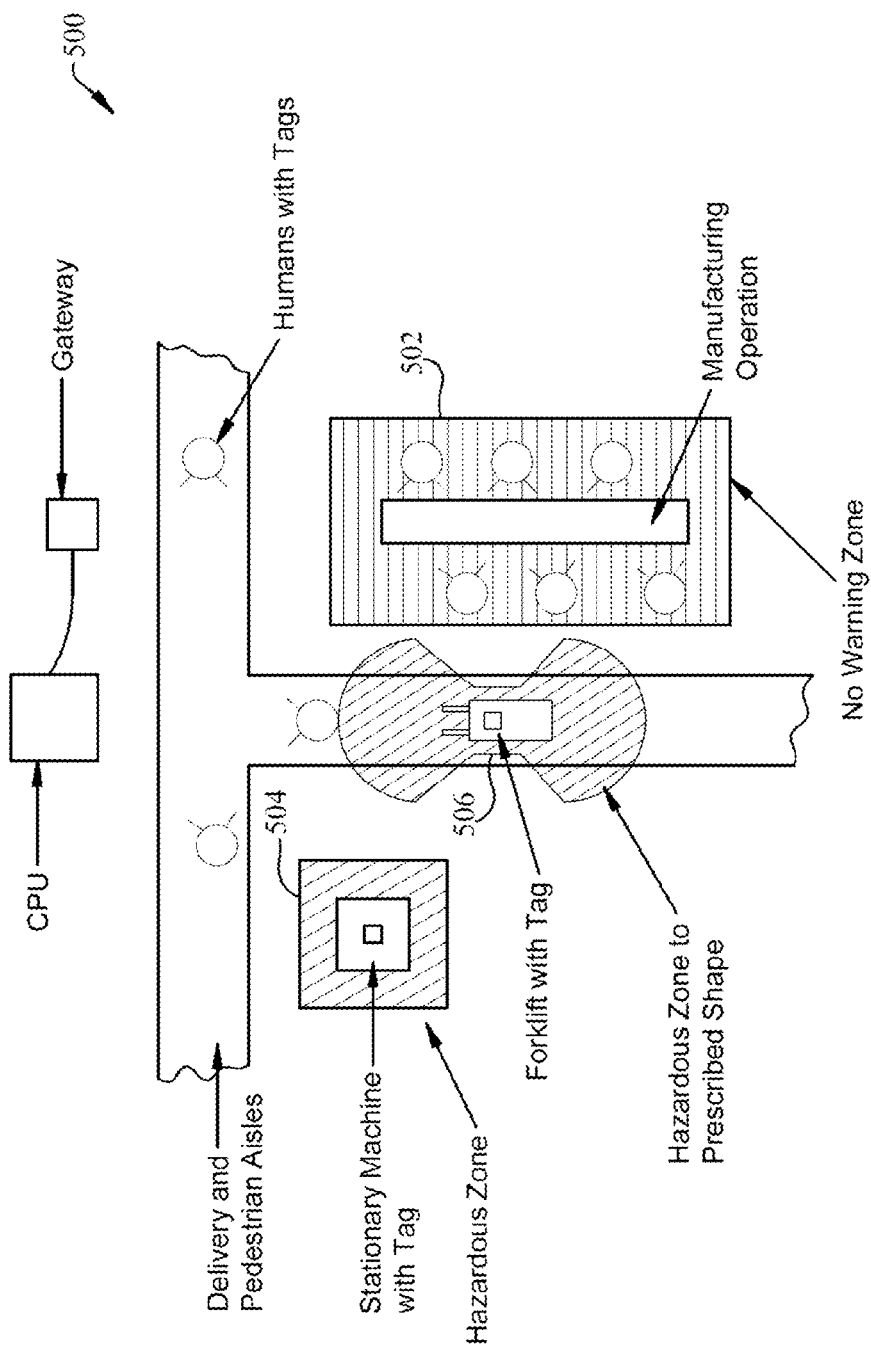
FIG. 5 illustrates an alternative static zone designation in accordance with aspects.
Figure 6:
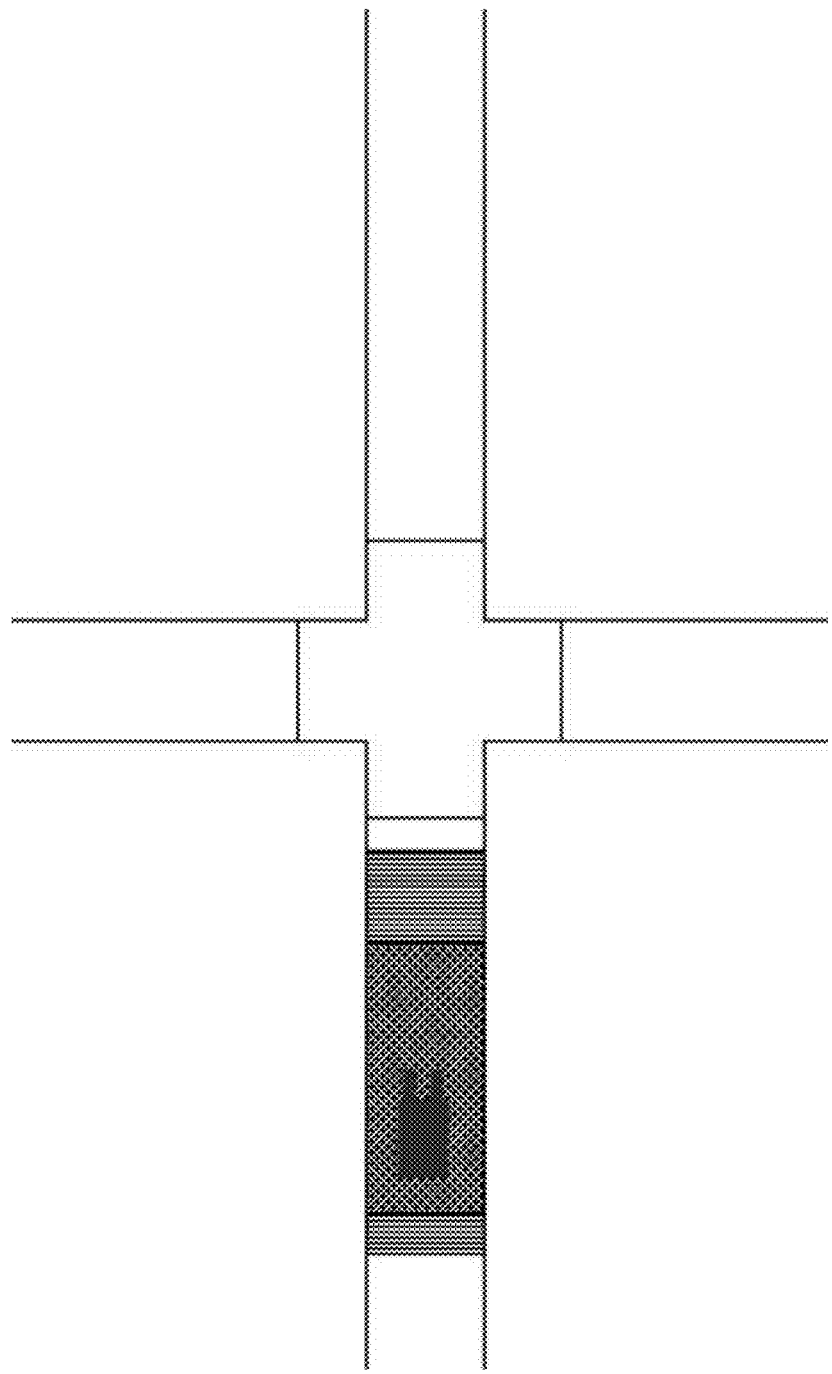
FIGS. 6-12 illustrate example zone designation and adaptability in accordance with aspects of the innovation.

FIGS. 4 and 5 illustrate example zone layouts (400, 500) in accordance with aspects of the innovation. As shown in FIG. 4, zones 1-M each can include 1-N tags (or radios as described herein). As described herein, the event warning system 100 of the innovation can be employed to track and render warnings in real time based upon criteria such as, position, relative location of assets, etc.

FIG. 5 illustrates an alternative static zone designation in accordance with aspects. As shown, a protected work or "no warning" zone 502 can be established whereby "red zone" warnings will not be rendered upon occupation within the zone. A hazardous zone 504 can be established about a stationary machine with a tag. Here, as tagged assets (e.g., humans, employees) approach or enter the zone 504, a warning can be rendered accordingly. Continuing with a description of the example zones, a hazardous zone of a prescribed shape 506 can be established as shown. Here, it will be understood upon a review of the description that follows, the zone 506, if "dynamic", can be capable of dynamically altering, for example in accordance with direction and velocity of travel as well as layout (e.g., intersections).

The system facilitates definition and employment of zones (e.g., 502, 504, 506) that, when a tag encroaches it, cause the system to take action as appropriate to its logic system (304). The features, functions and benefits of the innovation are described in greater detail below. In operation, the zones (502, 504, 506) can be defined into at least two basic types: static and dynamic.

"Static" zones are those that are "overlayed," e.g., onto a shop floor layout and come in various types. Dynamic zones travel with moving machinery and can change in shape and size as is appropriate to the machine's velocity, acceleration, direction, predicted path, and position in the facility. The alert sequences discussed in this section are system example standards and are not intended to limit the scope of the innovation in any manner. If a customer wishes to change any of them, their request can be accommodated via a special firmware loaded on the machine and human control boards.

The zone identification component 106 can be employed to define several types of static zones for a variety of purposes. Static zones are entered using the interface (API 102) and can be of nearly most any size or shape. A first type of static zone is a "protected work zone" (502). The concept of the protected work zone allows a worker to enter an area of the factory where they are in a "normal" position such as an assembly area where there is not typically danger of an incident with moving dangerous machinery. These zones will sometimes be "invaded" with a moving machine's dynamic zone (506) but only because the moving machine is in close proximity to the zone and because its dynamic zone has significant width. Dynamic zones will be described in greater detail below.

However, the protected work zone 502 is an area that presents a low level of danger. If alerts were to be presented to workers in this area, the frequency of their alerts would be high even though little danger exists. Typically, those situated in their work areas just adjacent to an active aisle, would be the most effected. To minimize unnecessary alerts and the resulting likely complacency to such an "over-alert" scenario, the innovation provides the facility with the ability to define protected work zone areas 502. When a human tag is in this area, the alert system to red zone encroachments is disabled.

Zones 502, 504, 506 are arbitrary static zones that the customer defines. While three zones are illustrated, it is to be understood that other examples exist that employ additional or fewer zones while maintaining the features, functions and benefits of the innovation. A customer may use these for most any purpose; some typical applications include:

Hazardous chemical area;
Area where hearing protection is needed;
Restricted zone for certain employees;
Area of frequent machine traffic or incidents; and/or
Others as needed.

As will be understood, examples can employ customer specific configurations and may also employ customer specific electronics firmware in order to enable an alert.

Another static zone example is an area of frequent incidents. These areas of frequent incidents are machine tag specific static zones and will only trigger an alert to a machine system. In operation, the zones work identically to how the zones 502, 504, and 506 work, but with machines. The machine operator receives an alert, e.g., in the form of a flashing white LED lamp on light bars mounted to the machine. Additional examples of devices are described below.

Yet another static zone example is an intersection zone which is used for alerts to pedestrians of an incoming machine. In addition to individual tags, the system can employ stationary flashing devices mounted near the intersection or at all of its corners. For example, when a approaches the intersection zone, the horn is auto-activated with two short beeps. These short beeps can alert other drivers and individuals within proximity of the presence of the machine.

A Mixed Use Zone is typically one in which machine (e.g., forklift) activity is erratic and unpredictable, but also where pedestrians frequently walk through. A typical example is a receiving or shipping area of a factory. In a Mixed Use Zone example, the forklift receives a yellow zone alert anytime that there are one or more forklifts and one or more pedestrians in the zone. The red zone alert function is unaffected.

The Parking Zone is an area where forklifts (or other machinery) are often stored during non-use. In this zone, for example, the refresh rate of the machine tag is turned down to once every 2 seconds until the pairing button is pressed which changes it back to 8 times per second. When a machine is in a parking zone and the paired operator leaves the parking zone, they become unpaired with the machine.

The Racking Zone is for human devices and is used as a place to store the devices (or tags) when not being used on a shift. The system will slow the refresh rate of the human tag to once every 5 seconds. Additionally, the refresh rate adjustment can be set to have a delay.

An exit zone is an area adjacent to a factory exit. Some customers may not want their employees to leave the facility with the human devices or tags. Thus, if a pedestrian enters an exit zone with their human device on, the device will beep repeatedly and then will beep occasionally until they re-enter the facility at which point, this beeping alert will be cleared. This alert will prompt an individual to return the human device to the facility.

A speed control zone is a zone where the speed control device relay is activated. This allows current to flow from a voltage source to a speed governing device. It can also be used to control most any other device that a customer requests. In other words, performance (e.g., speed) of a machine (e.g., forklift) can be auto-regulated within a defined zone as appropriate or desired.

In addition to "static" zones as described above, the system can also be used to define and monitor "dynamic" zones. These dynamic zones position and/or configure with moving machinery and change size and shape depending on many factors including, but not limited to, velocity, acceleration, and the machinery's position, e.g., on the shop floor.

The red zone represents a zone of potential danger should a human (e.g., human tag) enter it. There are three basic red zone types: stationary machine, moving machine, and moving machines in an intersection zone; both of the moving zone examples can be affected by the projected path of the machine.

Figure 7:
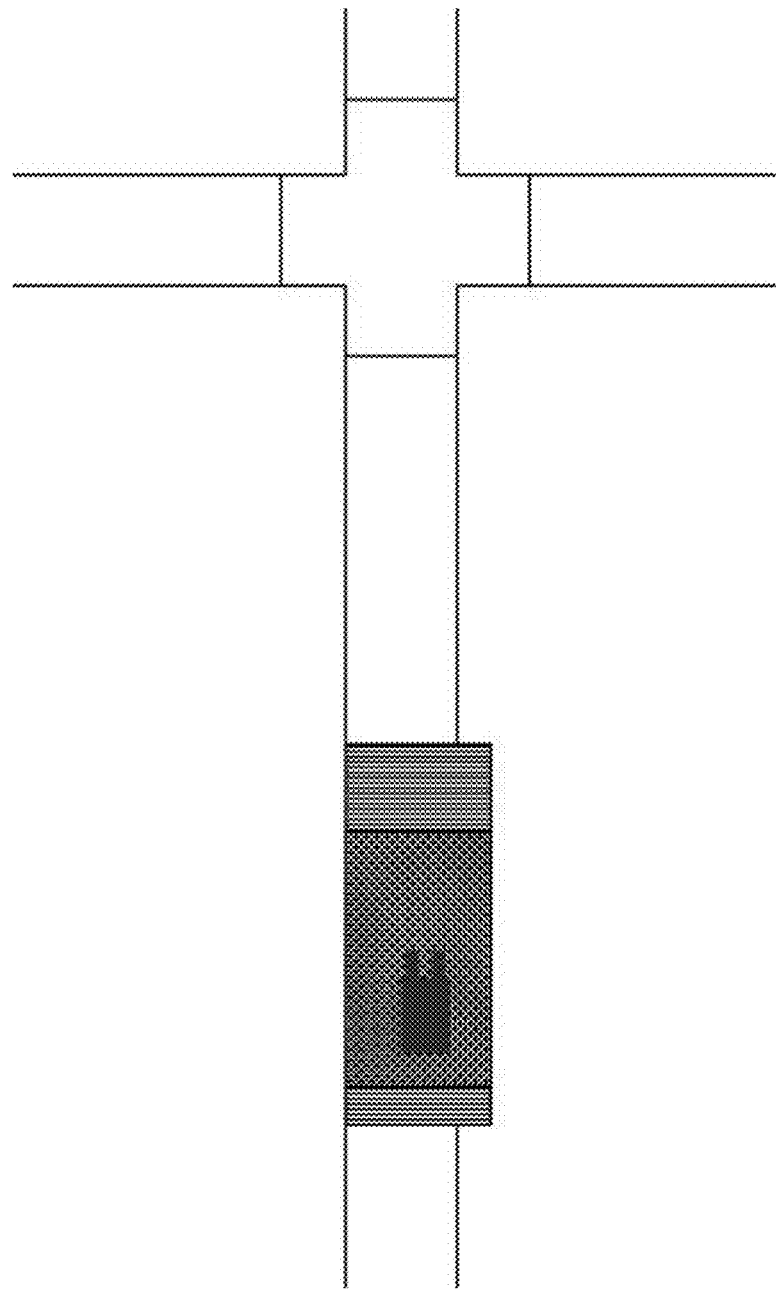

As illustrated in FIGS. 6-12, generally, the red zone projects forward, e.g., in a rectangular shape forward, based on the direction known from the machine's velocity vector and other factors such as acceleration, turn radius, etc. In examples, the center of the red zone will skew along the machine's predicted path unless the machine is traveling in a known driving aisle. Beginning with FIG. 6, if traveling in a known driving aisle, the shape of the red zone can snap to the edges of the aisle. As shown in FIG. 7, if the machine travels to a point that is substantially off-center of the driving aisle, the red zone width can extend into the work zone but will still include the entire width of the aisle. If the machine has a trajectory that shows that it will turn off of the driving aisle, the red zone will transition to the projected bent rectangle along the machine's predicted path. It should be appreciated that any zone shape other than rectangles are possible.

Figure 8:
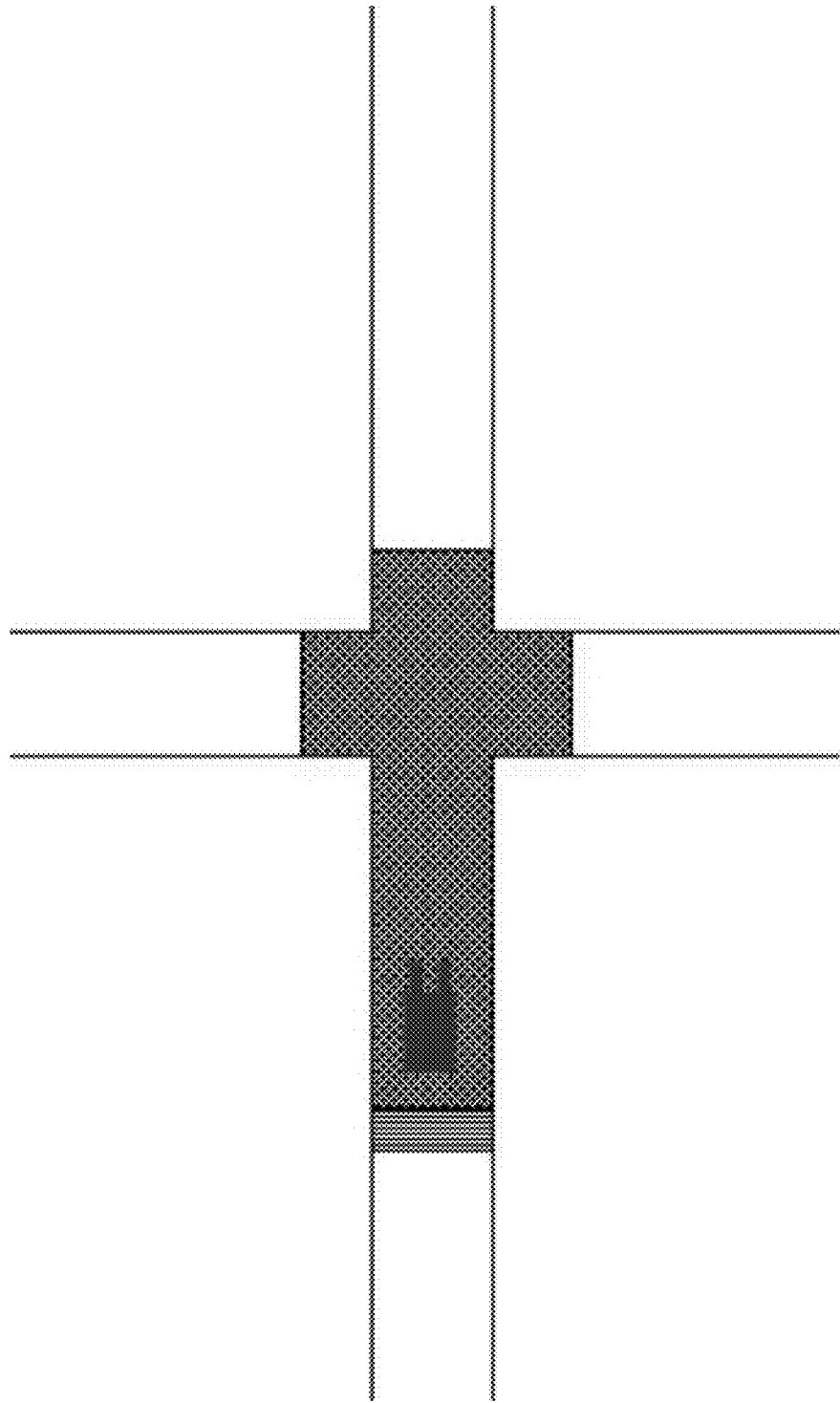
Figure 9:
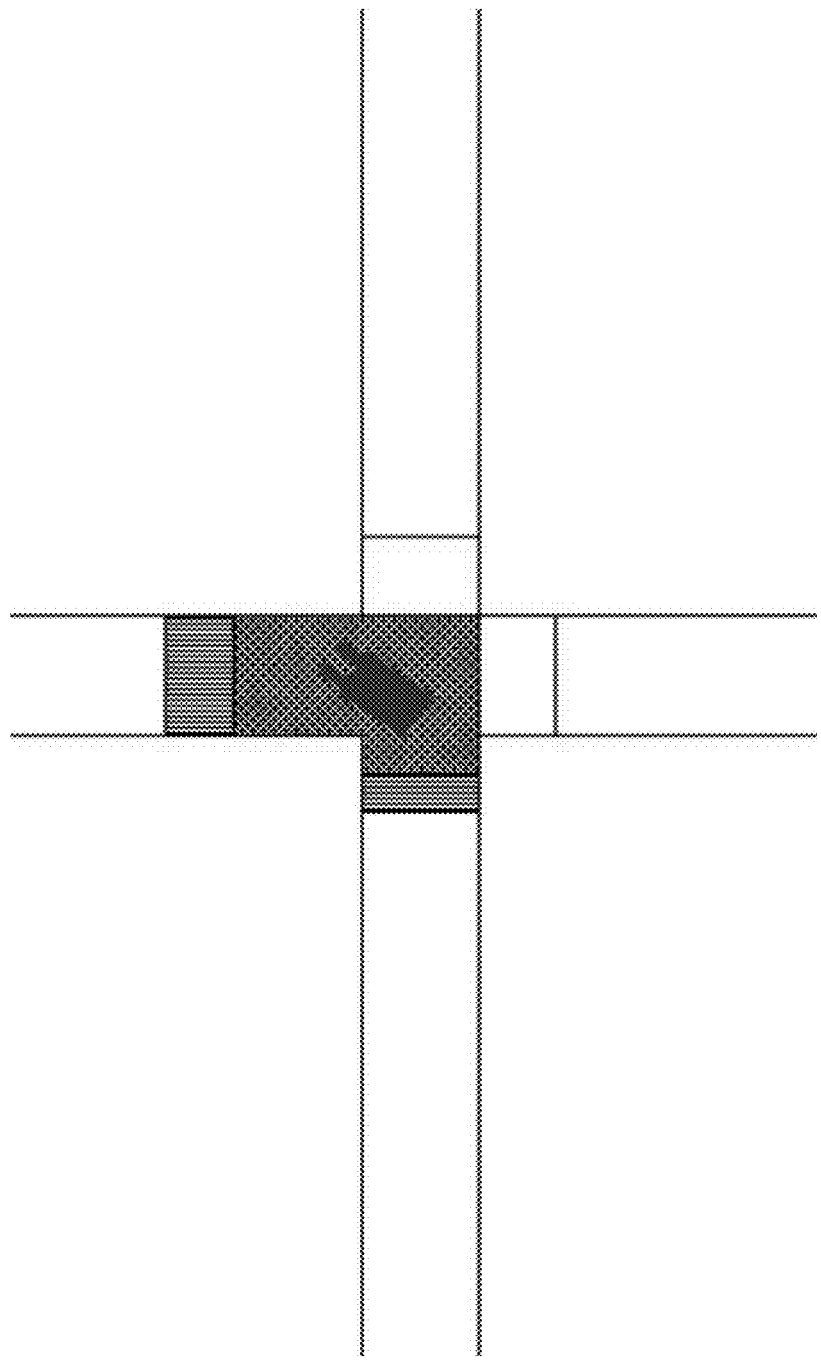

In another example, as illustrated in FIG. 8, if a machine is entering an intersection zone, its red zone will "finger out" to all of the directions that it might be able to turn to until its predicted path snaps to one particular direction. Similarly, if a machine turns at an intersection, the red zone can snap to the appropriate direction of travel as in FIG. 9.

Figure 10:
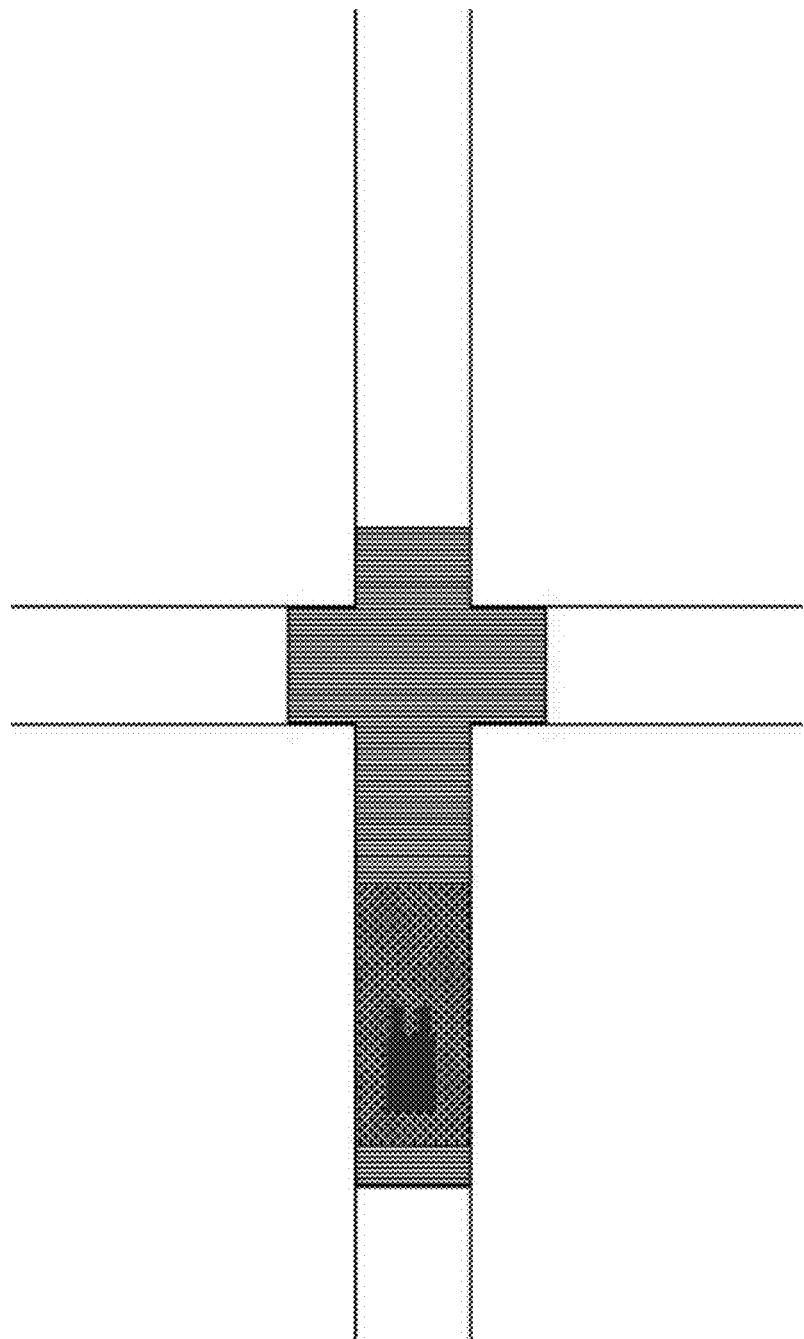
Figure 11:
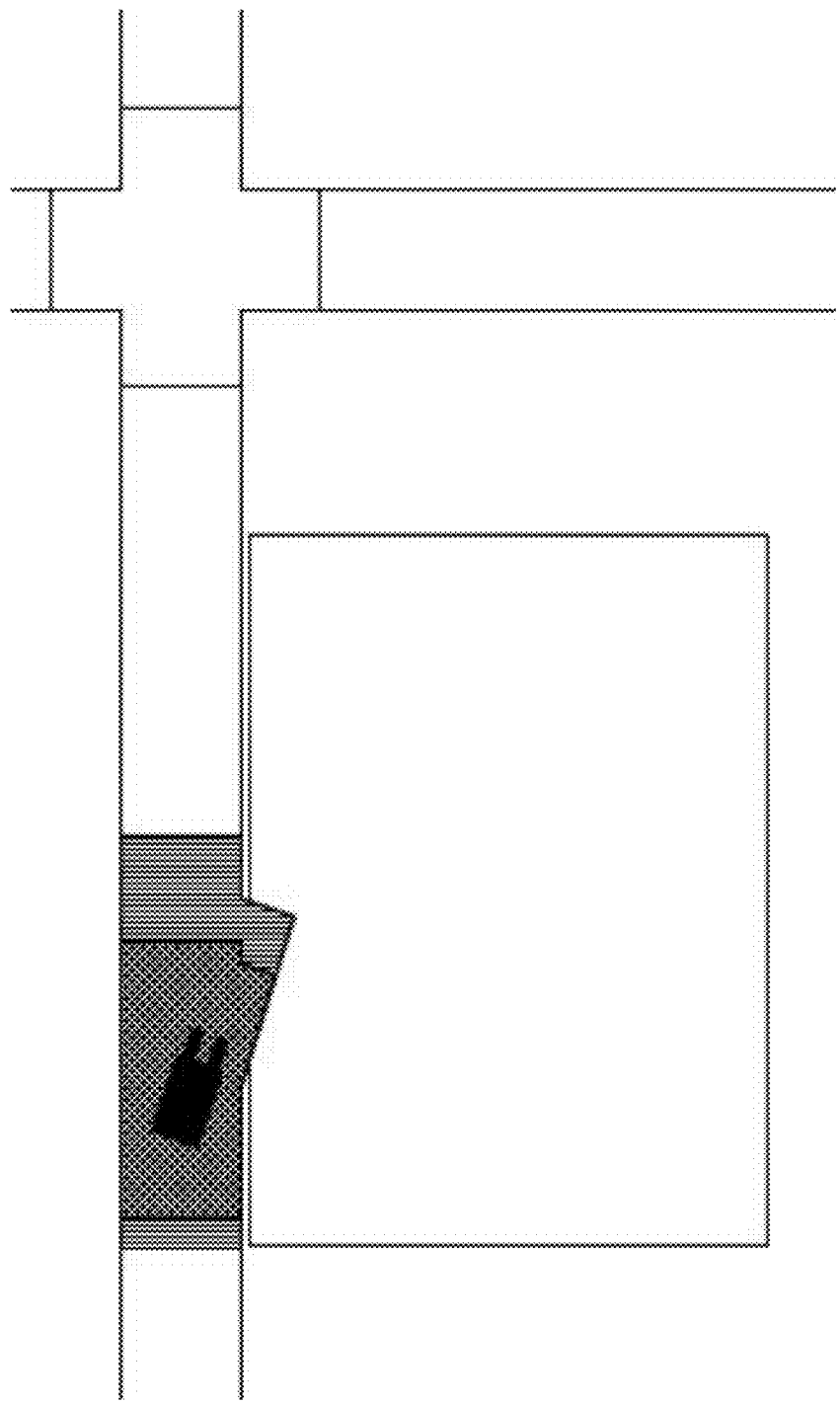
Figure 12:
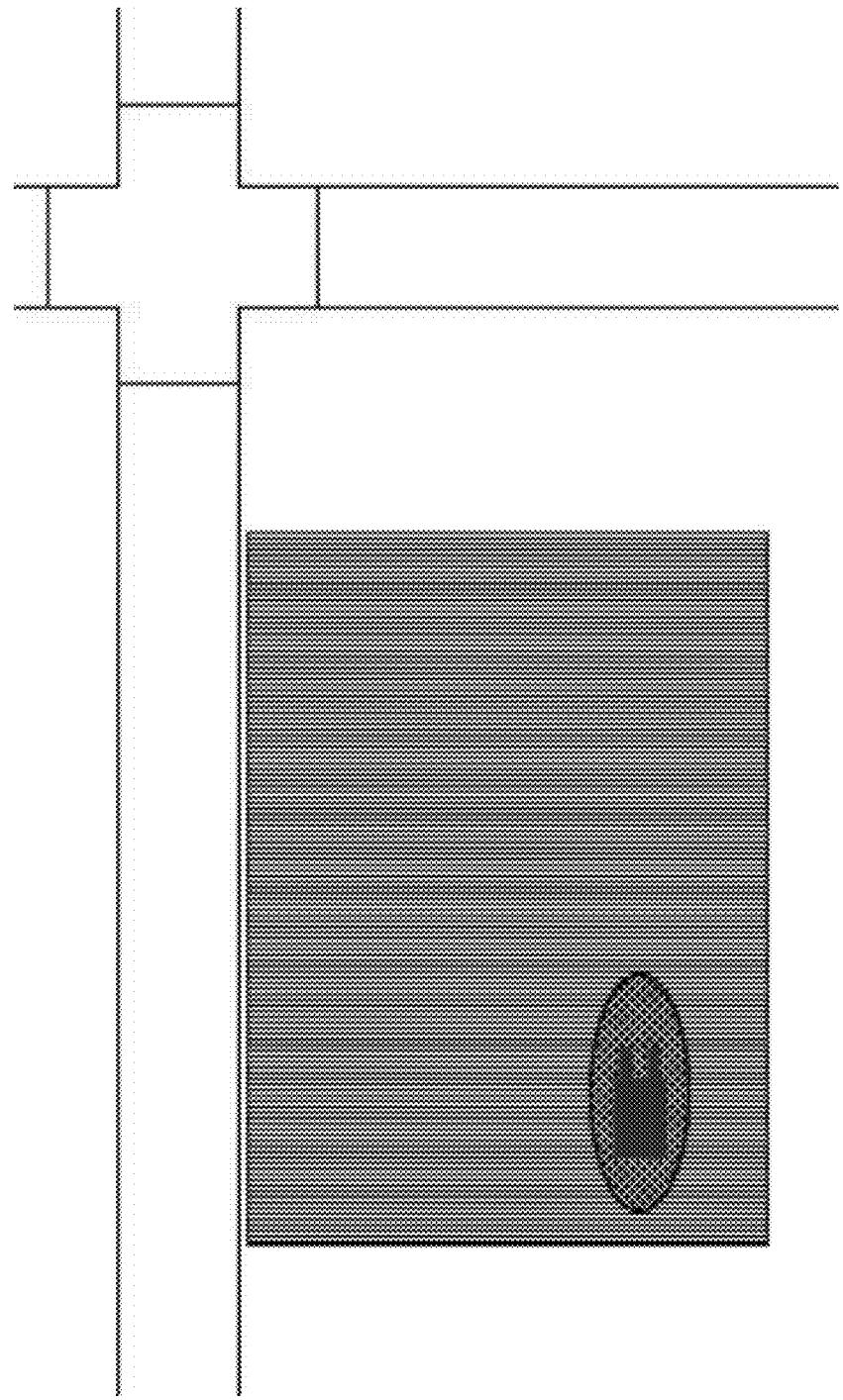
Figure 13:
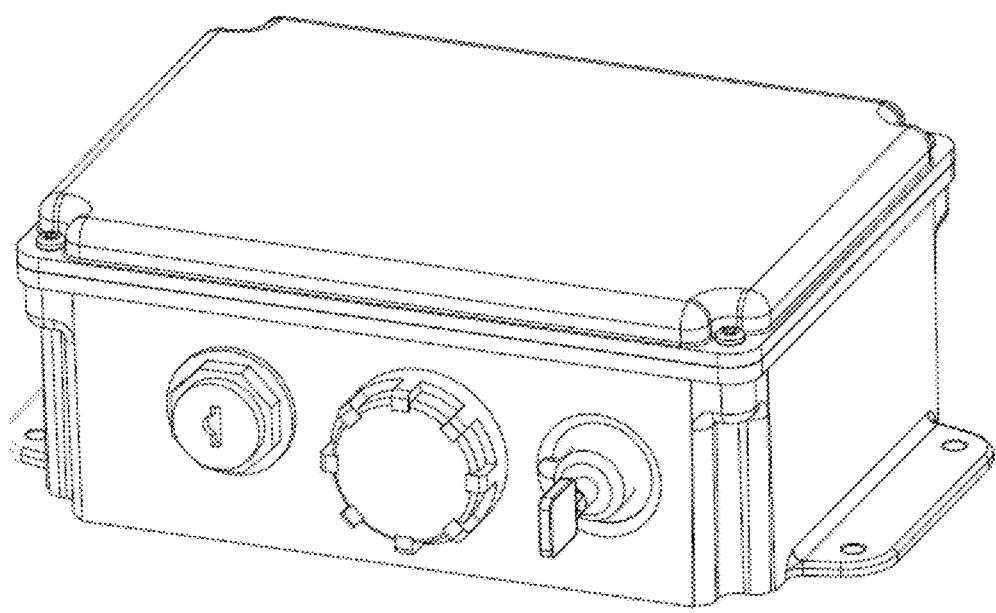
FIGS. 13-17 illustrate example views of a control module in accordance with aspects of the innovation.
Figure 14:
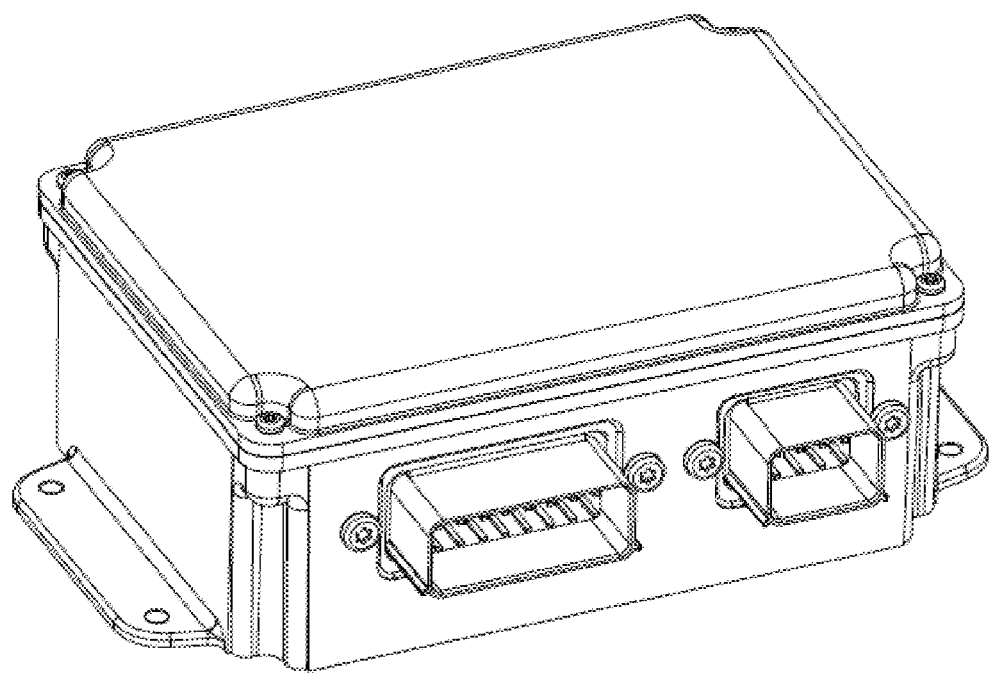
Figure 15:
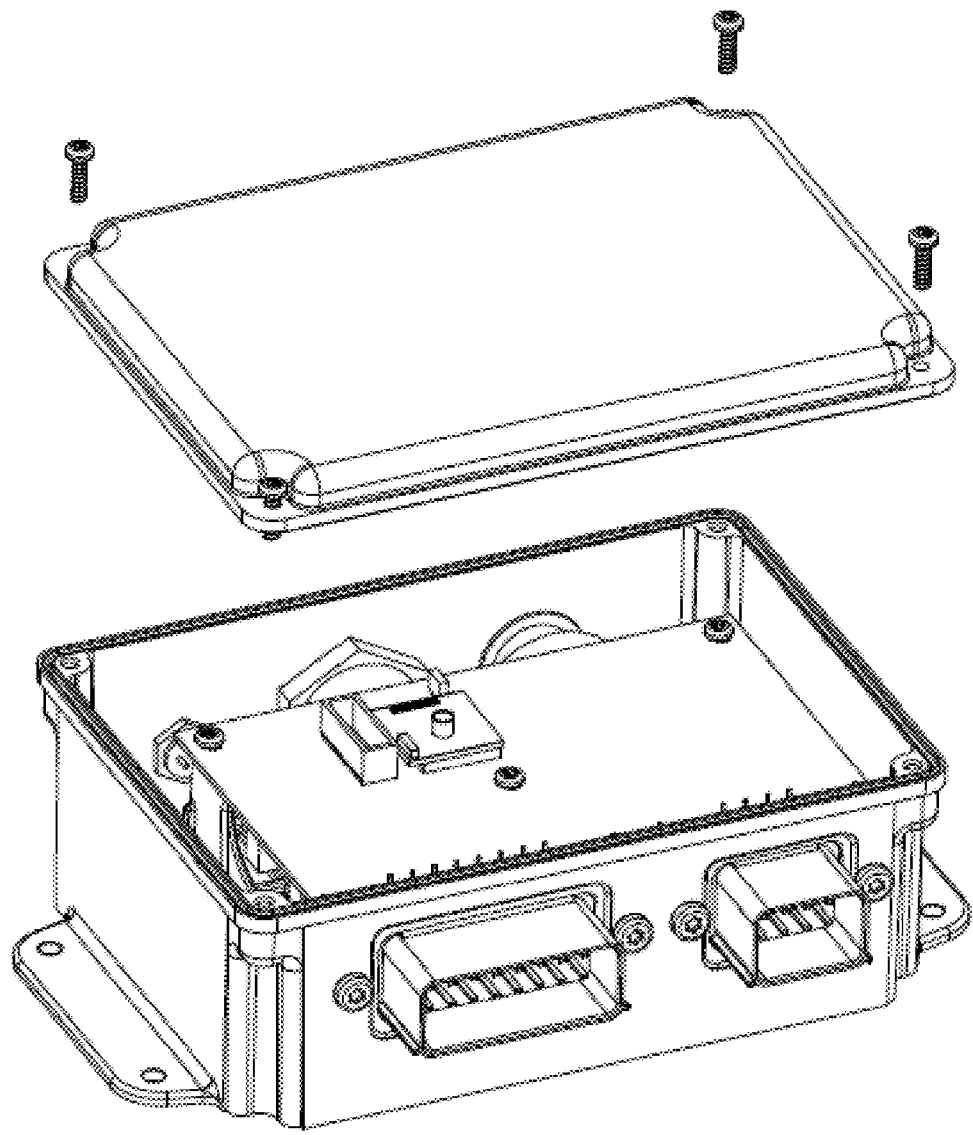

FIG. 10 illustrates a yellow zone that extends to an intersection as a machine approaches (or is directed toward) an intersection. FIG. 11 illustrates a "bent" or distorted red zone in accordance with a trajectory of travel of a machine, e.g., off a designated path or driving aisle and into a work area. Finally, FIG. 12 illustrates a mixed use zone having red and yellow zones therein.

In most any type of a human tag encroachment into a red zone, the machine operator receives an alert, for example, that is a rapidly blinking red LED lamp on the lightbars. Similarly, the human receives either a vibrating or audible alert or no alert at all depending on their personal preferences, which are described below. Additionally, the machine device enables power to a flashing strobe (e.g., customer option to install or not).

The case of a stationary forklift and a red zone encroachment is a special case. Because the stationary forklift can move at any time (e.g., provided there is a driver operating it), it can move at any time without notice to the human or pedestrian. Therefore, if such a case occurs, the machine device will enable the strobe power and can interrupt the machine's ignition circuit (e.g., both are customer options). In other words, the machine's engine or power can be stopped upon receipt of the alert.

As shown in the examples of FIGS. 6-12, the yellow zone is a larger projection of the red zone based on a "percentage greater" basis. Otherwise, it can be the same shape as the red zone and can be affected by all of the factors that change the shape and size of the red zone. Humans (e.g., pedestrians) do not receive alerts to yellow zone encroachments; however, machines can receive a rapidly blinking yellow indication.

Following is a discussion of additional alerts in accordance with aspects. Referring first to a pessimistic communication status, sometimes, a machine or a human will enter an area of the shop floor where either the tag cannot receive downlinks on the 2.4 GHz channel or none of the sensors can "hear" its UWB pulses. In this event, the machine systems will indicate the condition with a flashing white light alert. Pessimistic mode also takes place if the position data is available but deemed to be of poor quality; this may arise if the tag's UWB pulses are only heard by one sensor, if there is a conflict between sensors or if there are missing position data points. In one example, if a human device enters pessimistic mode, the representation increases from a point to a circle.

If a machine enters pessimistic communication status, all of the zones increase in size, e.g., by 25% in every direction. If there is a yellow or red alert state when the pessimistic state is triggered, the state and zone size is locked until the communication state is confident and is also cleared naturally.

A machine device enters pessimistic no communication status when there is no 2.4 GHz radio contact. If the machine enters no communication status, the system stops sending alerts other than the pessimistic alert.

With regard to pairing, an authorized operator who wishes to drive a machine must first come within the machine's red zone. When the operator does, the forklift will become disabled and the appropriate optical alerts will take place at both the machine's and the human's alert systems in order to prompt pairing. To "pair" or associate the operator with the machine, the operator initiates a pairing request, e.g., by pushing a "pairing button." If a proper pairing is possible, the machine is re-enabled and provides a proper indication. For example, the system can provide three flashes of the white and yellow lamps.

In aspects, there may be cases when a supervisor (or other individual with proper authority) wishes to override the alert system of a machine. Typical scenarios in which this would be useful include:

Machine having to operate for a long period of time in close proximity to workers by plan such as when they are placing a new die in a press;

System becomes disabled or partially disabled in a particular area of the plant; and/or Machine control board is not functioning properly and production work/material moving needs to continue Of course, these are but examples of typical scenarios—others exist which are to be included within the scope of the innovation and claims appended hereto. In these cases, it can be advantageous to be able to continue operation of the machine without the horn and strobe being active. During supervisor override, the white and yellow lamps are lit solid, the ignition interrupt/horn/strobe are disabled but red zone encroachment alerts continue to be indicated to humans and the machine with the appropriate optical indication.

Poor driving habits are common in factories and warehouses. Two of the most typical and dangerous, both to the machine operator and to pedestrians, are driving too fast and turning too fast. The system can include customer inputs to define the limits for velocity and rate of turn. If a machine operator violates these upper limits, the white lamp will light. Additionally, as described herein, a speed governor or other control device can be employed so as to regulate a machine within defined parameters (e.g., speed, rate of turn, etc.).

As described herein, the system 100 is designed with product features that provide both supplemental safety as well as an alert list for the most typical manufacturing scenarios in a way that minimizes over-alerting people. It will be appreciated that over-alerting such as is the case with horn honking, backup beepers, and strobes can cause people to become complacent to the alerts to the point that, since they are so common and frequent, makes them less useful than they were at the time when they were originally installed.

In operation, the tag identification component 108 can effect pairing. Operator pairing to a machine is an important element of the system in terms of functionality and mitigation of failure modes. The concept of pairing is that a machine operator is associated to the machine that he/she wishes to operate. Without this association and the resulting resetting of the red zone encroachment state, the machine would continue to display red zone alerts and would be functionally disabled via the ignition cutoff circuit. Operator pairing is complex as it might be initiated in the following aberrant conditions:

Operator that is not an authorized or licensed operator;

Request occurs when the operator and machine are in pessimistic communication mode (e.g., either for 2.4 GHz or UWB);

There are too many workers in close proximity to the machine such that the system cannot decipher which person pressed the pairing button; and/or The machine has gone out of range or in pessimistic mode and returns in range some time later.

Once an operator is paired with a machine, that operator continues to be paired until an un-pairing event takes place.

Normal pairing occurs when an operator requests a pairing and both the operator and the machine are communicating, e.g., on both the 2.4 GHz and UWB channels. In this case, the system can communicate with both tags and it also can compute their position and relative position. In a particular aspect, normal pairing occurs if and only if the following criteria are met:

- Forklift is stationary;
- Pairing button is depressed;
- System recognizes only one human tag in the stationary red zone of the machine; and
- The human tag recognized is an authorized operator.

A common situation will occur when many operators or other workers are congregated around a machine. In this case, operator training will instruct the operators to convince the others to leave the area of the machine; generally, this is best safety practice anyway. And, once the machine is paired with an operator, any human tags still in the machine's red zone will disable it anyway. This provides a side benefit of the system in that the operators will need to teach the other workers to not come in close proximity of a stationary machine both during a pairing event and in normal operation.

Provisional pairing takes place when the system receives a pairing request but is not receiving position data for either one of the tags. This is a common occurrence for facilities that do not employ a sensor grid that enables seamless coverage. In this type of facility, there is UWB coverage in a small part of the warehouse area, e.g., left side of the plant floor layout and covered minimally by a particular cell. It is typical for forklifts (or machines) to exit this coverage area, stop for a period of time, become unpaired, and then need to be re-enabled such as would happen over a lunch break. Because, the 2.4 GHz communication channel is less directional and has a much larger range than the UWB channel, the system will be in data communication with the machine and human tags. When it is time for un-pairing, the innovation and RTLS systems will un-pair it. Since the tag still has communication on the 2.4 GHz channel, the system will recognize a pairing request when one is made after such un-pairing. Since authorizing the machine with the supervisor override is cumbersome and time consuming, the system can enable the machine through provisional pairing even though the identity of the operator is not known.

With the machine enabled and blinking its pessimistic mode alert, the operator can drive it. Once it is "seen" on the UWB channel, the system will be receiving position data from the machine and possibly from the person operating it. If the system recognizes the operator's position within the red zone, that person is an authorized operator, and it is the only human tag in the red zone, then the system will pair that operator with the machine and he/she can continue to drive the machine. On the other hand, if the system does not receive position data from an authorized operator's human tag, e.g., typical in some situations due to the metallic blockage of the UWB pulses from a forklift's safety cage, it will continue to operate normally until either an un-pairing event or it recognizes a human tag in the red zone that is not an authorized operator's tag. In this case, the system will enable the red zone encroachment alerts which are indications to the "operator" to stop, dismount the machine to enable UWB communication, and press the pairing button.

A pairing request when a machine's tag is out of 2.4 GHz range will not be recognized by the system. Here, the tag will only make one pairing request per button push and will not continually transmit the request nor will it hold the request until it exits pessimistic mode for the 2.4 GHz channel. In this case, the machine, if it became un-paired for any reason, will only operate with a supervisor override. If it did not become un-paired which is a more likely event as it has been out of communication on the 2.4 GHz channel, it will become un-paired once in range of the 2.4 GHz channel if it has exceeded the un-pairing time limit and the last known paired operator can be seen and is outside of the un-pairing radius. If it did not exceed the un-pairing time limit, it will continue to operate normally unless the system recognizes a human tag within the red zone that is either not the paired operator or is not an authorized operator. This will put the machine into a normal red zone encroachment alert sequence which will, as above, be the indication to the operator to stop, dismount the machine to enable UWB communication, and press the pairing button.

If the machine is still paired to an authorized driver and is being driven by another person, the paired driver will not receive red zone encroachment alerts on his/her human system until the machine is un-paired.

Unpairing is an event that the system keeps to a minimum as it is normal practice on the shop floor for a machine to be driven the entire day by one operator. Therefore, once an operator is paired to a machine, the operator stays paired to that machine until the following items take place simultaneously:

- The machine leaves UWB or 2.4 GHz communication for a period that exceeds the location timeout (variable set by the customer, e.g., via API); and
- The originally paired operator is seen in a position that is outside of the un-pairing radius (variable set by the customer, e.g., via API).

The feature of having an un-pairing time limit allows for the frequent activity of a machine leaving the UWB coverage area and directly returning. As in the above scenario, this is an event that is common when there is poor or no UWB coverage, e.g., in the racking areas of warehouses. Not having this means that operators would be required to "re-pair" every time they enter and exit such areas which could be an event that takes place a great number of times during a shift. In operation, each driver tag can be programmed with a different unpairing radius.

The unpairing radius, a variable that can be set by the customer, allows for the eventuality that the operator leaves the machine and another operator starts to operate the machine when it is not seen on the UWB channel (position information not known). If the machine remains in good communication on the UWB channel and is approached by a new operator, the new operator will set off the red zone encroachment alert as he/she approaches the machine. Only a pairing request and a subsequent pairing of the new operator to the machine and simultaneous un-pairing of the originally paired operator will clear this red zone encroachment alert to enable the new operator to operate the machine. Operators will also become unpaired if they park the machine in a Parking Zone and they themselves have actively left the zone.

The system's devices can be powered by either or both machine power supply and battery powered. In a typical example, all of the tags receive their power from batteries, e.g., rechargeable for the machine device and coin cell for the human device. This means that, occasionally, the batteries will need to be replaced or recharged. The RTLS system, or the monitoring component 110, monitors battery voltage supplied to all of the tags and receives this information through the 2.4 GHz data channel. The system will periodically make calls for this information and will generate supervisor reports indicating when a tag's battery is in need of replacement.

The innovation's machine, human, and stationary devices all have a microprocessor that receives and analyzes data from the tag and determines what optical/audible alert to activate, if any, e.g., via logic component 304. Due to the need for periodic updates/improvements and for the ability for a customer to customize their alert types, the control boards in each of these devices have ports that allow the system to reprogram the firmware load on the microprocessors.

The innovation's system also has the capability for, through the RTLS API, to control the refresh rate of the tags. Since the system is based on zone type (e.g., either or both static and/or dynamic), the system can control the refresh rate of the tags based on the zone status of the tag in question.

Generally, human tags are programmed to refresh at 2.5 times per second and machine tags at 8 times per second. This can be lowered for tags that are in parking zones, racking zones, and protected work zones. Additionally, machine tags that are stationary for more than a specified threshold, e.g., 30 seconds, will lower to once per second.

The system can include a component having a feature that allows machines and humans to test their devices for proper operability at any time. It will include a static zone on the shop floor that, when a tag enters it, will enable a diagnostics routine so that the human or machine operator may ensure that the optical alerts are working properly. It is to be understood that this feature can also enable a feature of an automatic and electronic time card, e.g., one zone to punch in and another to punch out.

In aspects, for the human device, the alert is a red alert. For the machine device, it can cycle through all of the alert codes. There can also be a test human tag that activates the test diagnostics sequence.

State Locking is an important component feature of this system to mitigate potential failure modes. There are many scenarios in which it is important to continue to indicate a particular alert type even though the tag may go "out of range" of either communication channel (pessimistic mode). Pessimistic mode can be determined from two different sources: the quality of position data from the RTLS system, and the status of the 2.4 GHz channel. In aspects, the system's control board receives the former from the downlinks and the latter directly from the tag. The logic designs of both the control board and the software work to lock alert states when the tag enters pessimistic state.

One important scenario that may be a common occurrence on the shop floor is one where a worker approaches a stationary forklift, puts both into a red zone alert, and then while still in the red zone changes to a pessimistic state, such as might happen if a worker crouches down behind a forklift and the radio signals are blocked by the metallic forklift. In this case, the system's software and control boards will both lock the red state alert.

Additionally, the system manages alert code priorities and will not send a lower priority alert code to a tag if it is currently in a higher alert state. For instance, if a human tag is in a red alert state and then enters another zone, it will not send the second zone's state to the tag until the tag has cleared the red zone and then if and only if the tag is still in the second zone. It is to be understood that certain human tags can be disassociated with certain machine tags as appropriate to allow ongoing close proximity work that is normal for the operation.

When a battery is no longer able to supply sufficient power to the electronic devices or when a tag physically leaves a coverage zone, the RTLS system can position that tag in its last know position. The system will clear that tag position after it has not received any updated positions for a pre-defined period of time, e.g., 1 minute. This is referred to a tag with "no jitter."

As described herein, the core infrastructure of this system enables data packages to be sent both to and from the tags on the shop floor. Additionally, the system is able to employ RTLS standard tags for other product features such as the badge tag which has two buttons that can be programmed for most any purpose. Following is a list of additional features, functions and benefits to be included within the scope of this disclosure and claims appended hereto.

Stationary flashing devices for intersections and throughways;
Driver's habits reporting system (driver-by-driver) for number of zone alerts, over speed/rate of turn issues, etc.;
Data logging by tag on number of red zone encroachments;
Movement data logging for accident recreation;
Movement data logging for tracking a worker's movements;
Movement data logging for replaying a machine's path throughout the day for studies on route efficiency;
Safety Central . . . a data logging repository for safety related information generated by the system and other facility related data;
Find a missing tag application;
Visual reporting of areas of frequent incidents with the ability to overlay a particular area and receive statistical reports about it;
Visual reporting of high traffic and congestion area with the ability to overlay a particular area and receive statistical reports about it; and/or
Find a worker application.

As described herein, the innovation's system can provide at least the following features, functions and benefits:
1. Tracks the position data of people and machines (e.g., objects) being tracked on the shop floor;
2. Keeps track of the directional components of these objects including the velocity and in some cases acceleration vectors;
3. Manages static and dynamic zones wherein there may be a potentially dangerous situation;
4. Predicts zone encroachments of machines and people;
5. Sends alert messages through the RTLS system to people and machines indicating various warning states; and/or
6. Receives data (e.g., push-button data) from machines in order to pair a machine with an operator and thereby relieve the operator from receiving messages pertaining to a zone encroachment to zones related to that particular machine.

The system communicates with the objects and receives information about them entirely through the API. The system communicates with the tags, which can include firmware that enables communication to the controllers which translate or otherwise transform this communication into optical alert messages.

The system communicates with the RTLS API in the following ways:

| Function | In/Out | RTLS |
| --- | --- | --- |
| Read location data from a tag, read alarm confirmations, read communication state | In | Cell update/insert |
| Enter/Exit Static Zones | In | Spatial update/insert |
| Send alert codes to tags | Out | Data_schema notify |
| Adjust ping rates of tags | Out | Insert tag parameters Quos |
| Receive button press notifications | In | TBD |

The system can be a multithreaded system wherein many different threads of execution are carried out simultaneously with types of thread having different responsibilities. The main thread of execution simply sets up and initializes the shared memory areas and initializes and starts the input and output queues. The thread classes within the software and their responsibilities are:

| Thread Class | Initiated By | Responsibilities |
| --- | --- | --- |
| Main | Main | Initialize shared memory |
| | | Generate queue threads |
| | | Start queues |
| | | Connect to Ubisense API |
| Location Update | RTLS | Write location information into shared memory |
| | | Put tag on input queue |
| Input Queue | Main | Take tag off queue |
| | | Update vectors |
| | | Clear alarm codes |
| | | Calculate communication state |
| | | Generate communication state alarm |
| | | Put the tag on output queue if has com alarm |
| | | If the tag is a vehicle: |
| | | Generate lists of tags in danger zones |
| | | Set the zone alarms in those tags and put them on the output queue |
| | | Set the alarm on self and put on the output queue |
| Output Queue | Main | Take tag off queue |
| | | Send communication and zone alarms |
| | | Update ping rates |
| Fixed Zone | Main | Read the zone that the tag entered |
| | | Calculate the appropriate alarm |
| | | Set the alarm and put the tag on the output queue |
| Button Press | Main | Read the button press and the vehicle tag id |
| | | Generate a list of tags near the vehicle |
| | | Pair the vehicle to the appropriate person |

The communication between systems is dealt with through the use of input and output priority queues. In aspects, there are 3 levels of priority, low, medium and high. Each has its own input and output queue and is managed in a FIFO (first-in, first-out) regimen. The priority is handled by assigning different numbers of input or output threads to each queue. For example, the high priority queue may have 30 threads reading from the queue and processing positions, while the lowest priority may only have 5. Each thread will take the next tag from the queue and process it before going back to the queue for another.

The priority queue system helps to ensure that communication between the systems is only done when needed and processing only happens when required. It also helps to maintain priority in terms of providing the most resources for the most important and pressing situations. The system can use a series of filters to smooth the position data received from the RTLS API.

The system's devices are those items that provide an enclosure for the electronics and interface to the users of the system, e.g., humans and machine operators. The machine devices can include a control module (examples shown in FIGS. 13-17), a lightbar (e.g., optical indicator) (examples shown in FIGS. 18-20), and a pairing button enclosure (examples shown in FIGS. 21-23). Examples of system devices are described below. While specific examples (e.g., sizes, shapes, materials, configurations, etc.) are shown and described, it is to be understood that alternative aspects can employ variations and alternatives without departing from the spirit and/or scope of the features, functions and benefits of the innovation described here. Rather, these variations are to be included within the scope of this disclosure and claims appended hereto.

Figure 16:
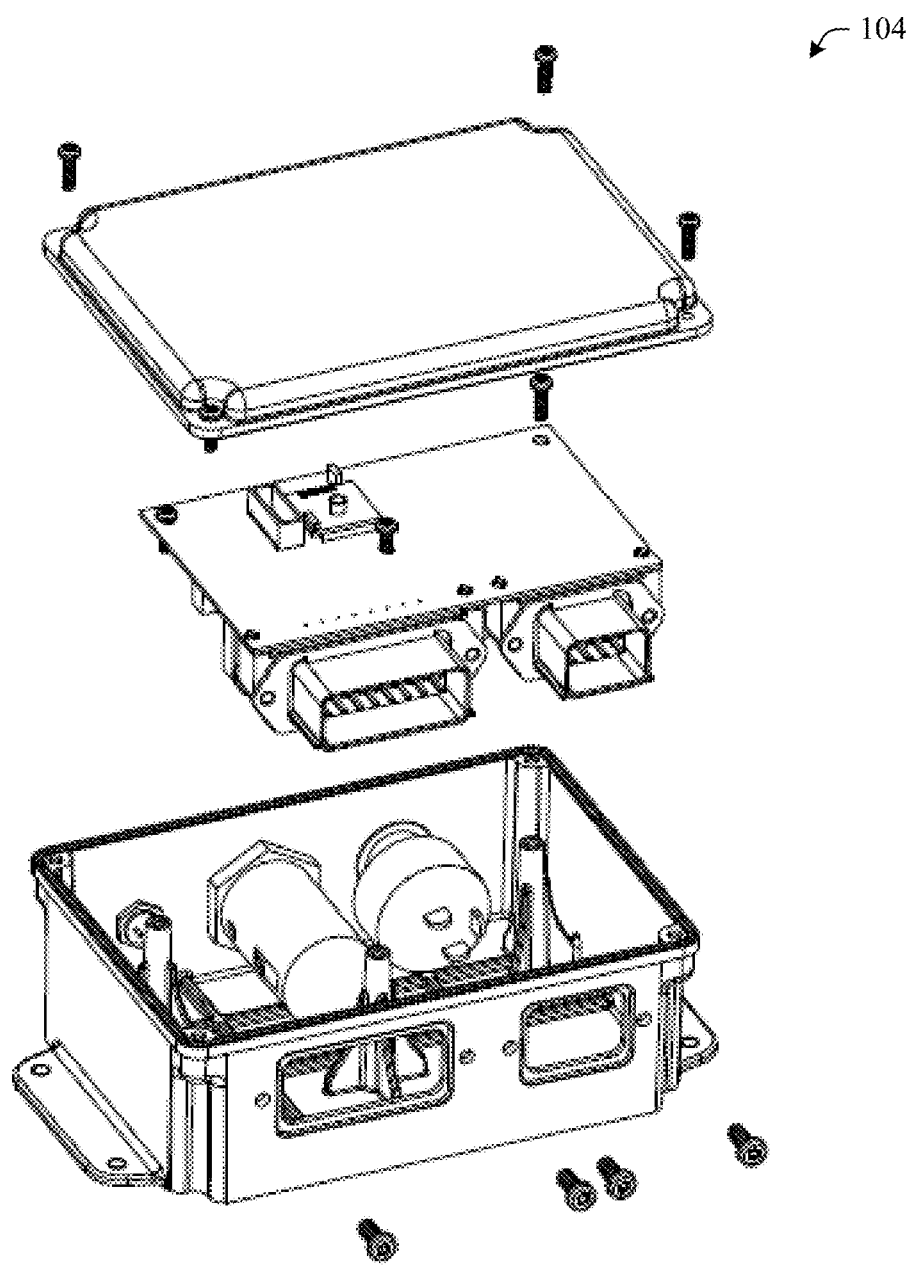
Figure 17:
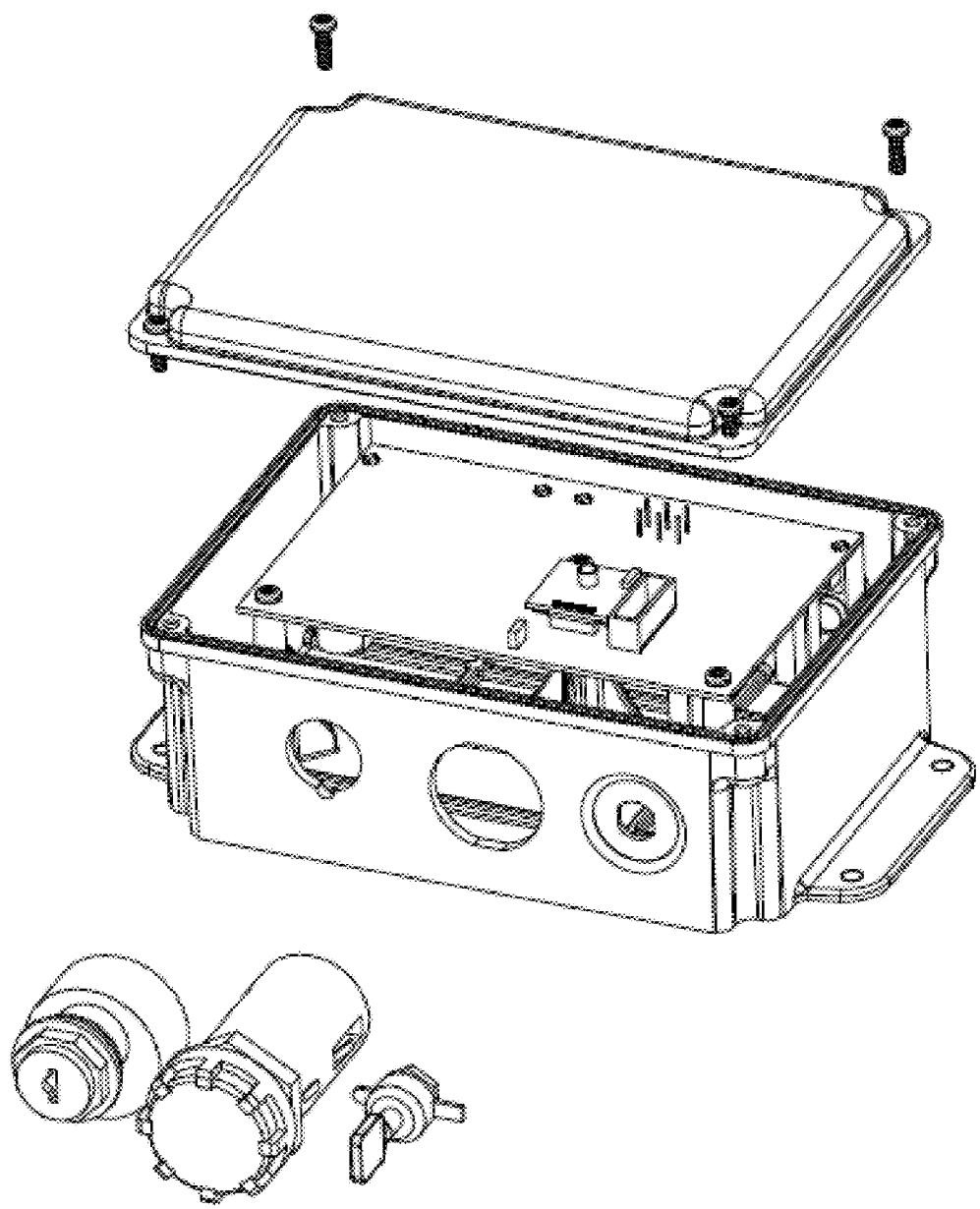

Referring to the example of FIGS. 13-17, specifically, FIG. 16 that illustrates an exploded view of a control module 1600, the module houses a machine control board, tag (attached to a connector on the control board), battery, and supervisor override switches. The enclosure can be designed with a tongue and groove type moisture and dust seal appropriate for protection against occasional rain but not submersion. The control box is configured either for mounting with screws/bolts, zip ties, or double-faced adhesive strips; it is to be fitted to the top of the safety cage of a forklift or other similar position on other machines away from metallic blockage of the radio signals to the sensors overhead in the facility. Further, the module can be manufactured of plastic, composite or most any other suitably rigid material.

Figure 18:
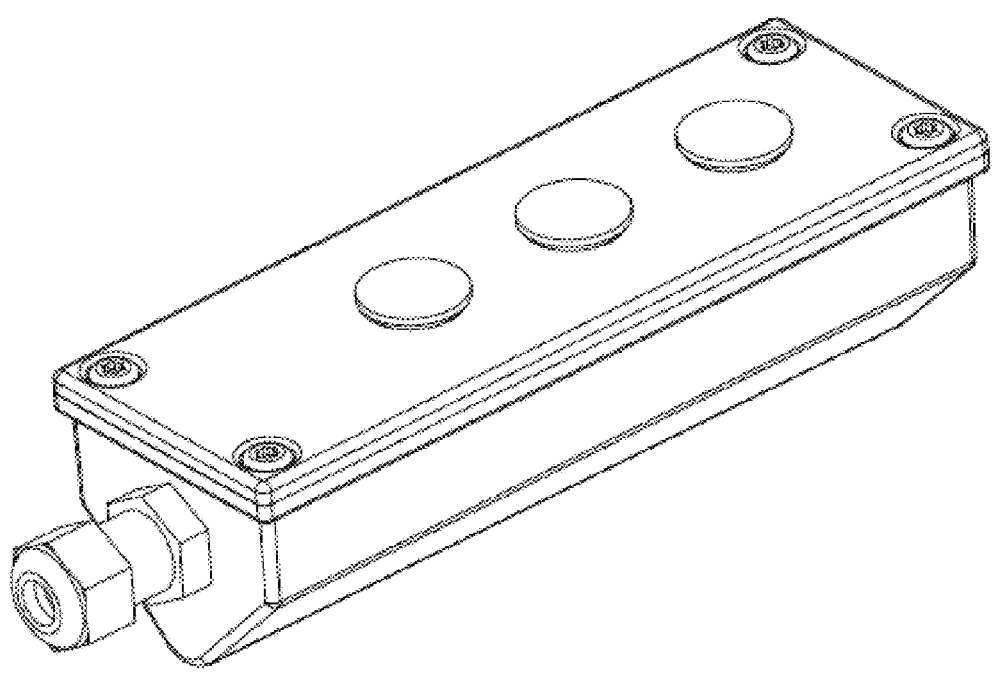
FIGS. 18-20 illustrate example views of a lightbar in accordance with aspects of the innovation.
Figure 19:
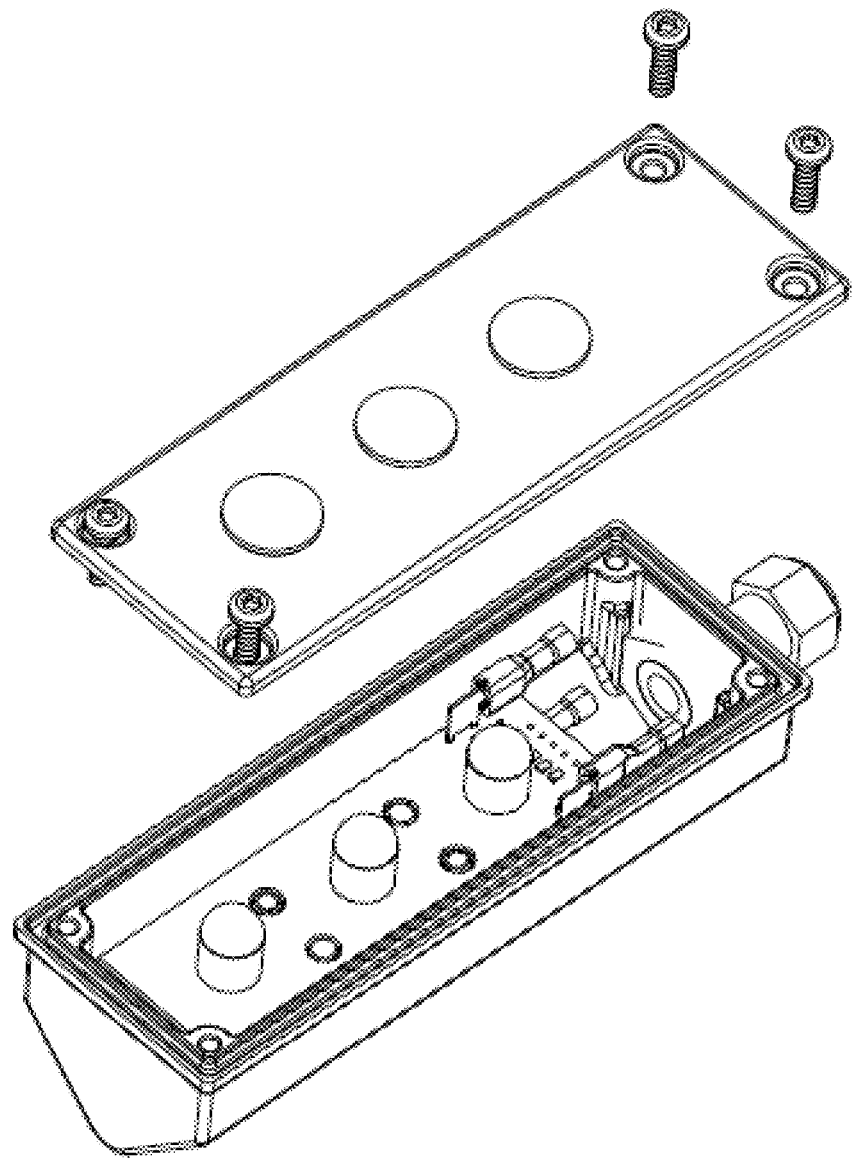
Figure 20:
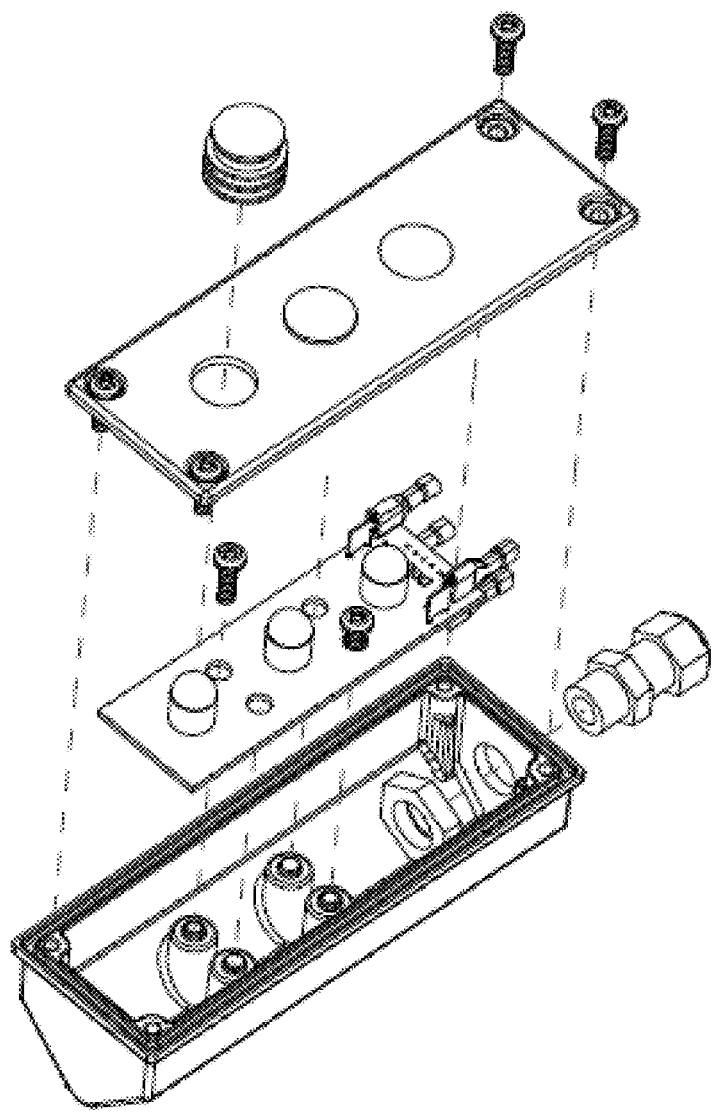

An example lightbar, illustrated in FIGS. 18-20, is an optical alert device for machines. As illustrated in the exploded view example of FIG. 20, the lightbar can include a printed circuit board with three high intensity LEDs that provide optical indication of alerts through colored lenses attached to the front panel. The enclosure can have a tongue and groove moisture and dust seal similar to the control module. It is to be understood that the housing of the lightbar can be manufactured of plastic, composites, metal or most any other suitably rigid material. The lightbars can come pre-wired to a connector (not shown) that plugs into one of the two connectors integrated to the control module. The lightbars can be mounted to the machine by double-faced adhesive strips (or other attachment means) and are intended to be used in triplicate, e.g., one in the front and centered and one on each side in the rear viewing line of the operator of the machine.

Figure 21:
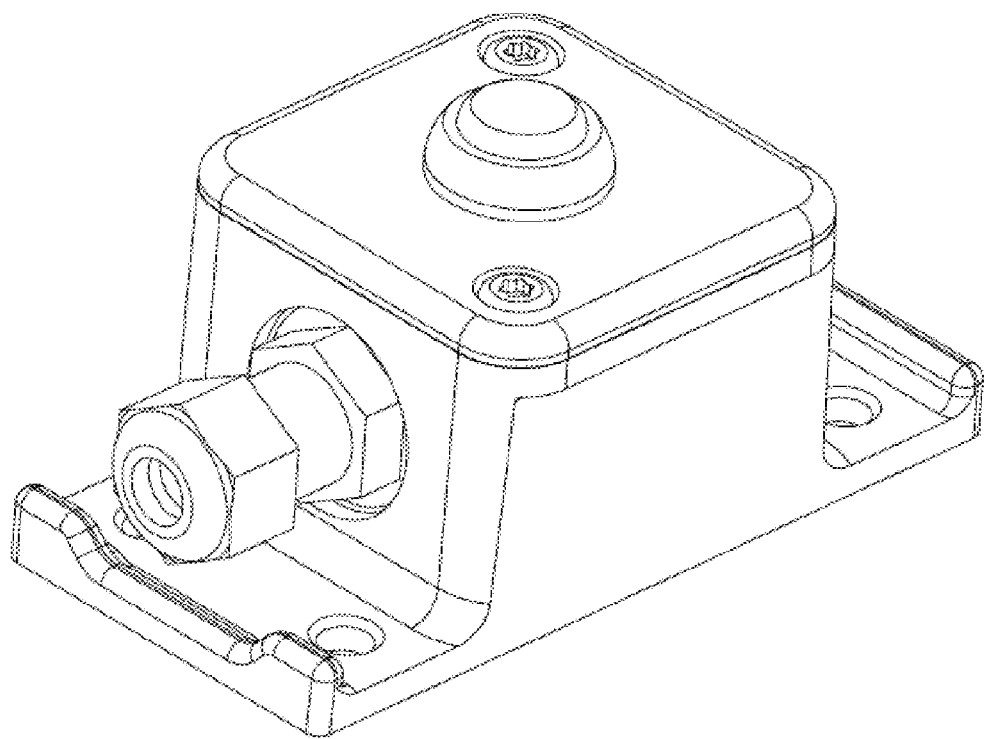
FIGS. 21-23 illustrate example views of a pairing button assembly in accordance with aspects of the innovation.
Figure 22:
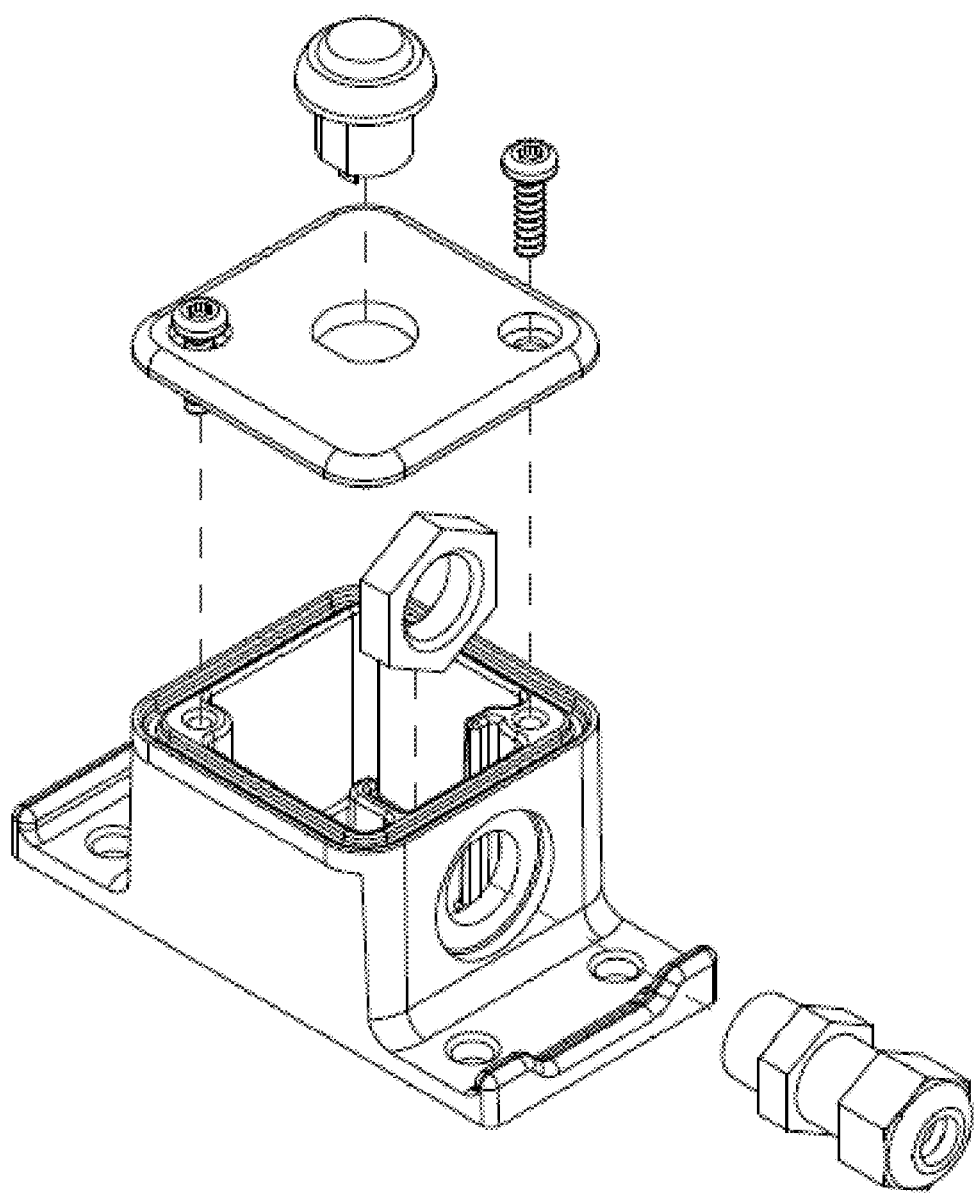
Figure 23:
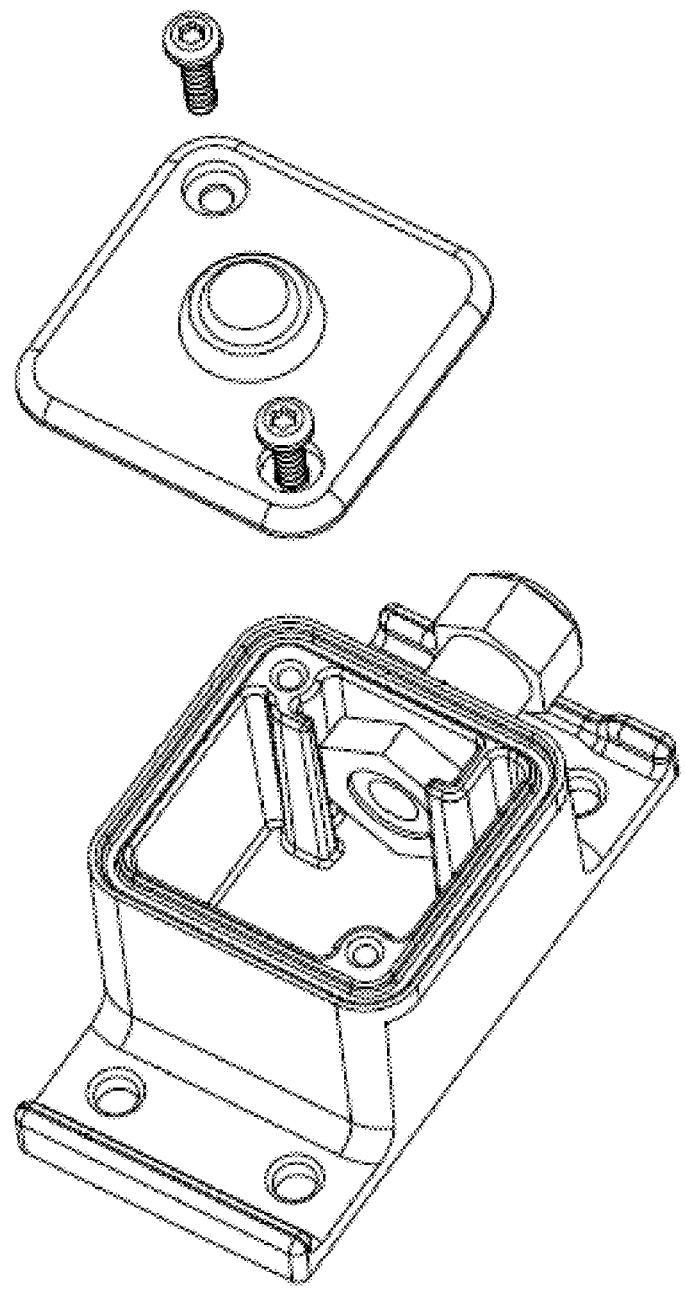
Figure 24:
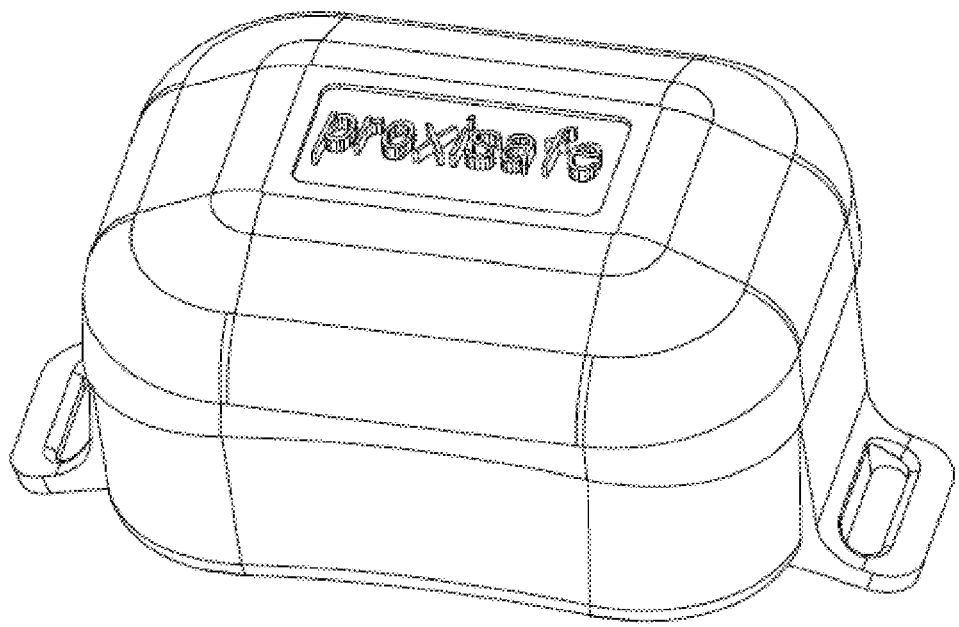
FIGS. 24-27 illustrate an example wearable tag in accordance with aspects of the innovation.
Figure 25:
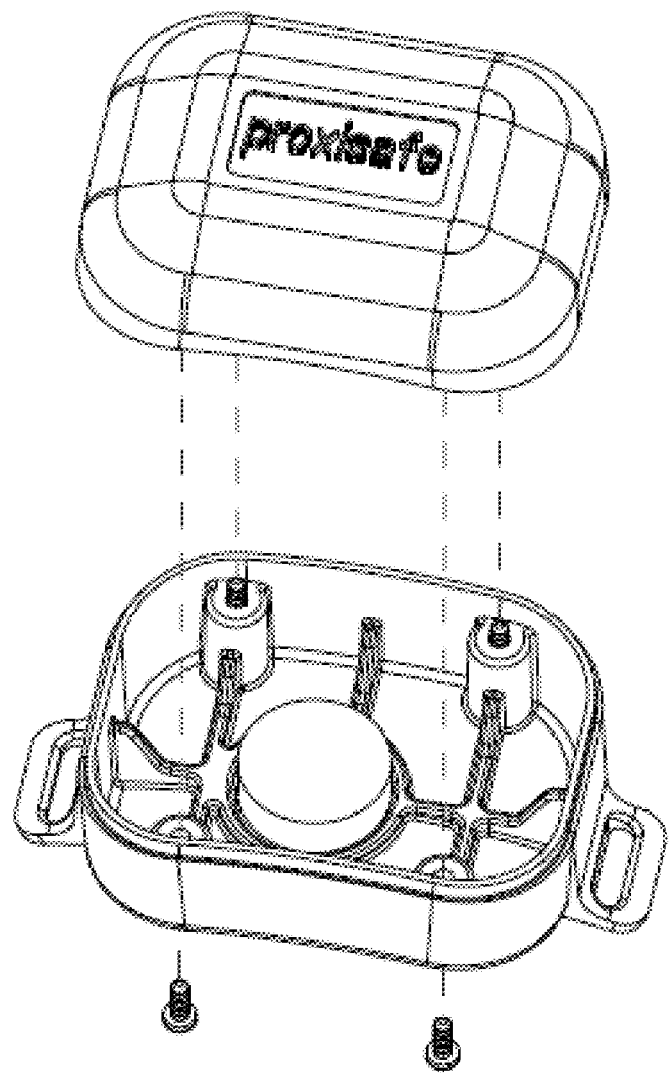
Figure 26:
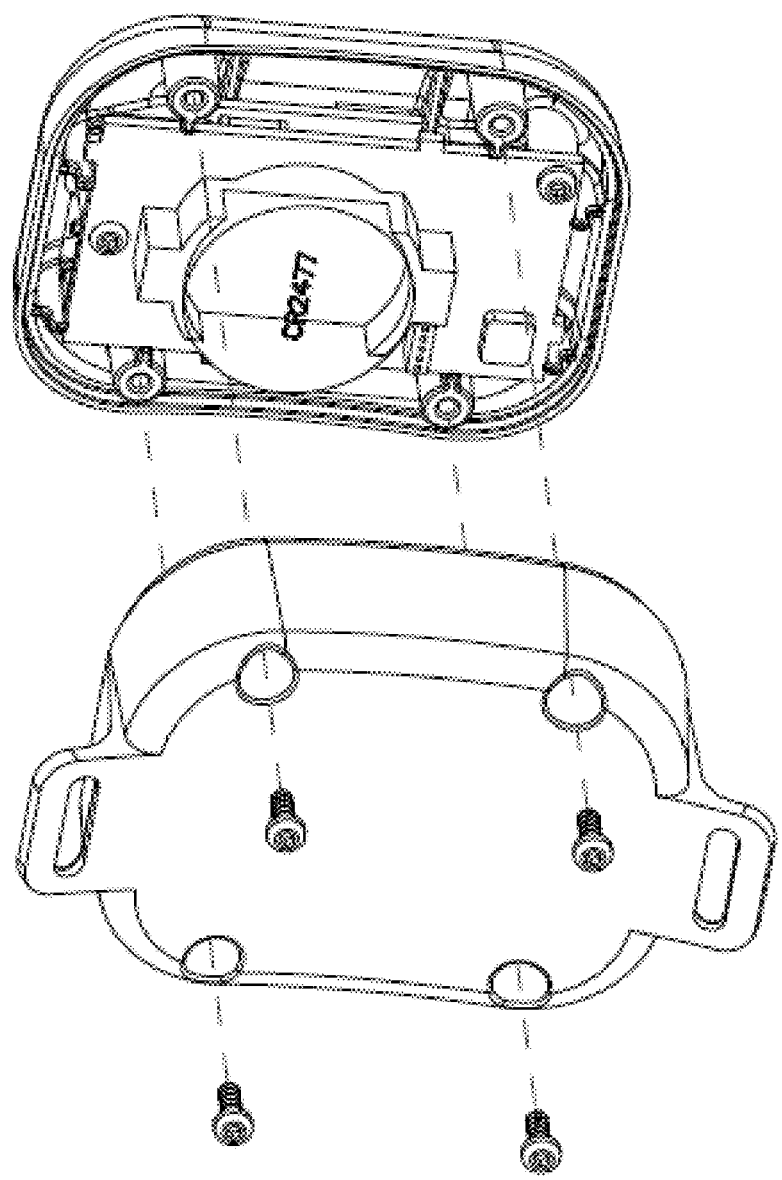
Figure 27:
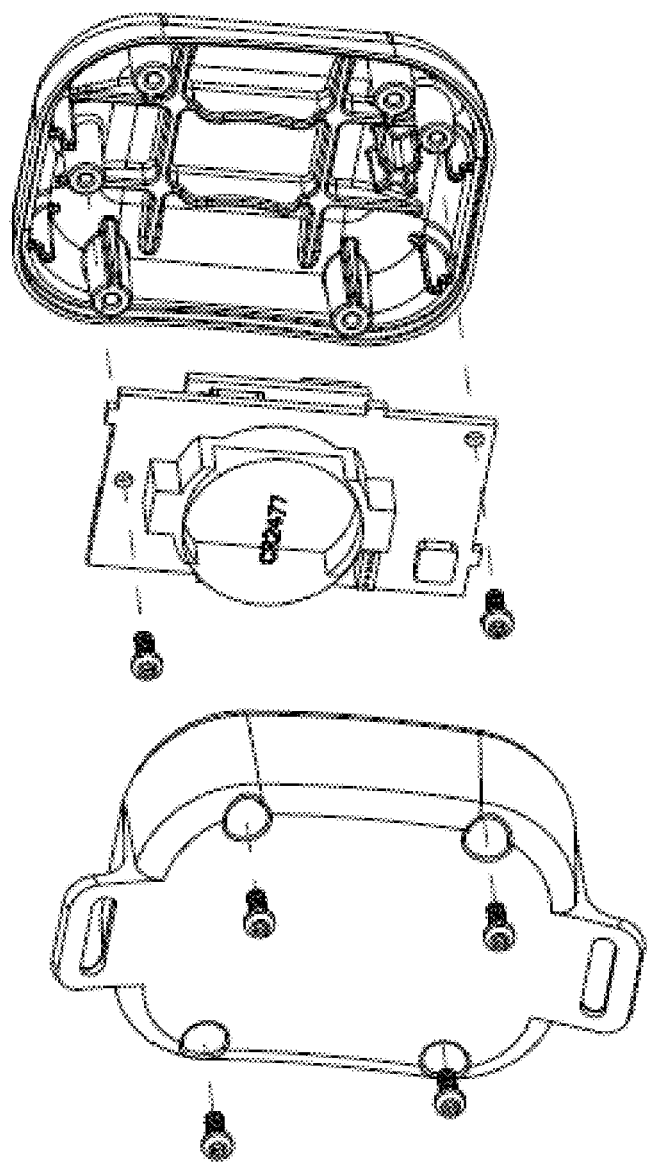

FIGS. 21-23 illustrate examples of a pairing button enclosure in accordance with aspects of the innovation. As shown, the pairing button enclosure, also moisture sealed as described above, houses the pairing button and can be manufactured of plastic, composite, metal or other suitably rigid material.

Referring now to FIGS. 24-27, example human devices are shown. In the human device system, the control module and audible/vibration alert system is integrated into one unit that can be mounted to a pedestrian, e.g., to a pedestrian's shoulders with two badge style clips. As illustrated in the exploded view of FIG. 27, the device can include a tag, control board, enclosure, battery, vibration motor, and audible alert device. In aspects, the design is configured for right or left shoulder usage. It is to be understood that alternative designs, e.g., wrist-mount, ankle-mount, etc. can be employed in other aspects of the innovation. The enclosure is designed to be moisture and dust resistant in a lap joint configuration. As well, as described supra with regard to other housings, most any suitable material can be used, including but not limited to plastics, composites, metals or the like. Each human device can be configured for audible alert, vibration alert, visual alert, or no alert. Additionally, the system can be configured to randomize or change the alert type to prevent complacency of alarm types.

Following is a discussion of a product specification in accordance with aspects of the innovation. It is to be understood that some of the following has been described supra. Accordingly, some of the following will act as a review or overview of the details described above. The main functions of the system are spread out between various threads, but conceptually the following descriptions describe the major functions. It is to be appreciated that variations and alternatives exist which are to be included within the features, functionality and benefits of the innovation.

With regard to reading location information, the innovation's software and control system subscribes to an RTLS callback to receive updated location information from every tag in the system. Because different tags may be in higher priority situations, the processing for this call is kept very small. The action on the part of the system is to simply copy the location information into a shared memory area and indicate that the new information has arrived. The system will process the new information once it has time to do so with all (or a subset of) other priorities taken into consideration.

It is possible for the RTLS location information to be overwritten with new information before the system has time to process the location information for that particular tag. The tag does not lose its place on the queue in this case, but the newer information will be used once the tag reaches the front of the queue for processing.

In the example, the only time that a tag may lose its place in the queue is if the tag has switched priorities since the last write. In this case, the tag will be removed from one queue and put on the end of the queue with the new priority.

With regard to processing location information, once a tag reaches the front of the queue, it gets processed. The first task is to calculate and update the vectors. Each tag has direction, velocity and acceleration unit vectors associated with it. The next task is to check for zone encroachments and for quality of the tag's position data.

Communication alerts are determined when the location information is processed. The RTLS system has an indication of accuracy within the location message. If this accuracy is below a certain threshold, a communication alert is sent to the tag and the tag is placed on the appropriate queue depending on the severity of the overall alert state. Once again, if the tag is already on a queue, it is moved to the new queue—provided that the new alert is not of a lower priority than the alert that has been queued.

In the system there can be two types of alerts: communication and zone. The communication alert causes the tag firmware to enter pessimistic mode where the tag must be unsure of any message telling it to enter a lower alert state. If the tag was on a high zone alarm and waiting in the queue, a low communication alert would not cause the tag to move to a lower priority queue; rather, the tag would take the overall highest priority between the outstanding communication and zone alerts.

Like communication alerts, zone alerts are set on the tag and the tag placed on the queue most appropriate to its overall alert state. For example, if there were no zone alerts, but the tag was placed into a red zone alert state, it would be placed on the highest priority output queue.

Zone alerts are generated when a tag moves into fixed zones within a building, and also when they encroach into a dynamic zone. An example of this is when machines approach areas with people. In these cases, the people will have zone alerts set on their tags if they fall within the vehicle's dynamic red or yellow zones. In either case, the highest possible alert state is calculated and the zone alert is set on the tag and the tag is placed on the appropriate priority queue.

It is possible for alert states to change while the tag is waiting for processing on a queue. If this happens, the tag may be moved to a different priority queue. The system defines a return to neutral state and a type of zone alert.

Because the alerts are sent optionally through the RTLS system with asynchronous communication, the software needs to receive a confirmation that the tag received the alarm code. Some RTLS systems will generate a confirmation of receipt code that will be sent back to the system on the uplink. The code that the system receives will be the same code that it sent down to the tag.

Until a confirmation is received from the RTLS system, the system is designed to put the tag back on the end of the priority queue immediately after the alert is sent. This means that the alert will be sent at every available opportunity until such time as it gets cleared in the system as a result of receiving the confirmation of receipt. Regardless of a receipt of confirmation, the system can send alerts in triplicate and requires 3 successful confirmations before completely clearing the queue. Intersection zones and exit zones will be sent once with one successful confirmation.

Following is an example process for clearing an alert. Since multiple alerts may be sent before receiving confirmation of the first one, the system implicitly confirms receipt and clears the alert if another alert is sent and then waits on that newest (or most recent) alert code confirmation. If an alert code confirmation is received, but the current alarm has not been sent yet (e.g., it is still in the queue), then that confirmation is thrown away as it is no longer meaningful. If the current alert has been sent at least once, and it matches the confirmation code, then the alert code is cleared and the tag is reset in the system.

It may be possible that a communication alert is cleared, but not a zone alert (and a tag may have both) or vice-versa. In this case, the appropriate alert is cleared, but the other remains and will continue to be sent until cleared. As soon as both the zone and communication alerts have been cleared for a tag, it is removed from the queue it inhabits.

In aspects, pairing is accomplished through a button press on the machine. In the preferred embodiment, this is received through the RTLS API. The software system looks to see which people are closely located around the vehicle and who are also authorized vehicle operators. If there is more than one potential pairing option (e.g., multiple tags in the pairing radius), the system will not pair. Only when there is one paring option will it then set the pairing state on the tags for the vehicle and person and put those messages on the queue.

While the potential operators are waiting for the pairing to take effect, they will be triggering the red zone alert state of the machine. This will cause the firmware on the machine to disable the vehicle from being driven. Only when a successful pairing has occurred will the operator be removed from the list of tags within the red zone. If there are other people within the zone at this time, the person may be paired, but the other tags will continue to trigger the red zone alert state and will continue to prevent the vehicle from being driven.

The responsibility for predicting and signaling zone encroachments (e.g., alerts) lies within the innovation's system. When the location information is read from the input queue for the vehicle, it not only calculates its vectors but also performs the checks for potential zone encroachments. The way that the system does this is through the use of projected dynamic zones, or geometric shapes surrounding a vehicle that stretch and distort depending on velocity, acceleration, and position on the shop floor.

In a simplest case, a vehicle is stationary and its shape is merely a circle of a defined radius unless its orientation is known in which case the zone takes on a different shape. Once a vehicle begins to move, the zone around it becomes a shape resembling a rectangle (or other predefined shape). The ellipse is roughly defined as follows:

1. The displacement after a set amount of time is calculated for each unit vector. For example, the red zone displacement may be defined by estimating where the vehicle will be in x seconds.

2. The current location and the estimated location are used as two inputs for the zone size determination.
3. The distance is calculated as a function of the speed and acceleration which increases as velocity and acceleration increase.
4. If the line of travel is a curve, the rectangle is skewed inwards along the curve orthogonal to the tangent at the point of the curve halfway between the foci or halfway as determined as a function of time, not distance.

Once the dynamic zone has been calculated, any points representing people within the zone are considered to be in that zone (red or yellow). Note that yellow zones are the same shape as the corresponding red zone but are larger by a set percentage or threshold.

The following charts describe the operation of the logic programmed onto the pcb microcontrollers for both the human and machine devices. FIG. 28 illustrates an example machine device firmware chart. FIG. 29 illustrates an example human device firmware chart. The software handles most of the logic for the complex scenarios. However, some scenarios, e.g., particularly the loss of 2.4 GHz radio contact, must be controlled by the hardware firmware as the innovation and RTLS software systems cannot communicate with the tag when there is no 2.4 GHz radio contact.

The firmware for both the human and machine device follows a simple logic of receiving a command/code from the SPI communication and, in turn, activating the appropriate alert codes, external devices (e.g., lightbars, strobe, horn, ignition interlock). It does this and locks that particular state until either it is cleared by the system or the tag enters pessimistic mode by leaving 2.4 GHz radio range. If it is in a particular non-clear state when it leaves range of the 2.4 GHz radio, it will lock that state until the tag re-enters radio range and is cleared.

The innovation's electronics hardware has the primary purpose of converting the alert codes sent to it through the sensor network and tag into alert notifications and control of machine ancillary devices. Specifically, every time a downlink is made from the sensor network, the tag requests a data transfer to the system control boards which, in turn, receives a data transfer (e.g., 32 byte data transfer) through a serial port interface (SPI). One of the 32 bytes contains two integers that relate to communication status and zone status. Through firmware, the system's control boards (human and machine) interpret the codes and make the appropriate responses in optical/audible (or other) alerts, and ancillary control of the machine.

The microprocessor has firmware programming that disables optical alerts in the event that the tag is in "sleep" mode; this will preserve battery power. Additionally, it has a timer function that ensures that a full and uncorrupted data set is received from the tag; if the entire byte set was not received, it deems the data corrupt and will reset/re-sync to receive future data properly.

The human control board can include the following major elements:
Battery and battery holder;
Power regulator;
Microprocessor;
Switching relay for audible and vibrating alarms;
Vibration motor; and
Audible alert indicator.

The human control board supplies power to the tag and is directly connected to the tag by means of a 20 pin female header.

The machine control board is a control board that can include the following major elements:
Multi-output power regulator;
Lightbar/pairing button 16 pin connector (IP67 sealed and mounted to the pcb);
Power 8 pin connector (IP67 sealed and mounted to the pcb);
Switching relays for 3 LED channels;
De-bounce circuit for pairing button;
Supervisor override key switch;
High power supervisor override key switch;
Re-enable forklift key switch;
De-bounce circuit for supervisor override switch;
High power relays for machine ignition interrupt, horn, and strobe circuits;
Microprocessor;
Battery;
Overheat protection on all high power circuits (horn, strobe, ignition, input supply); and
Control for exterior device such as a speed governor.

The machine control board can supply power to the tag and can be directly connected to the tag by means of a 20 pin female header.

The microprocessor has firmware programming that manages all of the alerts and codes that it receives from the tag. Additionally, it has timer and data buffer functions that ensures that a full and uncorrupted data set is received from the tag; if the entire byte set was not received, it deems the data corrupt and will reset/re-sync to receive future data properly.

Following is a discussion of example zone definitions and alert codes. In the system, the software monitors encroachments of tags to zones; this can be either a human tag or a machine tag encroaching on a variety of static and dynamic zones. Static zones are defined and monitored in the innovation's software and do not move relative to tags. Dynamic zones are associated to a particular tag and move with that tag as the tag moves.

Dangerous situations primarily arise out of a human tag encroaching into a machine zone. Machine zones are always considered dynamic even if the machine is stationary. Stationary machines present special cases but the zone itself is always considered to be dynamic.

The system will send all alert codes continually until a confirmation receipt is received. This ensures that the tag/hardware module has received the communication in the event that the microprocessor was resetting/re-syncing at the time that the alert/downlink occurred. The software will do this in a manner that the repetitive alert code is sent at intervals corresponding to the refresh rate of the tag so as to not over burden either the event warning or RTLS system with too much data traffic.

Static zones are used to provide alerts to special situations and to disable alarms as well as to preserve battery life through slowing the refresh rate of the tag. All static zones are programmed into the system by using the static zone application. In this application, the shop floor layout already exists and these zones can be made to exist anywhere in the facility and may be of any size or shape that the customer desires; they may also cross the borders of the sensor grid cells.

The protected work zone is an area that typically has communication on both the RTLS 2.4 GHz and UWB channels but is an area where workers commonly are stationed for most of their shift. To reduce the number of times a worker receives red zone alerts and to reduce complacency to the alerts themselves, the innovation can provide the protected work zone.

Within this zone, the alert states on the human tags are disabled though tracking of zone encroachments still occurs. These zones are defined by the customers in shape and size and do not have to be used if they prefer not to.

An intersection zone is an area prescribed by customers at any point in the factory where additional alerts may be desired. These do not have to be physical intersections as they can be defined anywhere where there may be a propensity for human or machine traffic and typically would be those areas where visibility is limited. When either more than one machine or one or more machines and a human tag reside in the zone, the machine optical alert system will flash the white alert. At all times, whether there are more tags in the zone or not, it will cause the machine horn to honk in a repetitive pattern. Intersection zones also cause the dynamic zones to change shape as a moving machine enters it.

Restricted zones are areas prescribed by customers and are exclusively used with the machine tags. Typical applications of the restricted zone are no drive zones. If a machine tag encroaches on this type of zone, the yellow optical indicator will flash on and off.

High Incidence Zones are areas prescribed by customers and are exclusively used with the machine tags. A customer may define such a zone where they know that previous incidents have taken place such as a machine striking a piece of equipment of physical attribute of the structure of the building. If a machine tag encroaches on this type of zone, the white optical indicator will flash on and off.

In an example, zones A, B, and C are areas prescribed by customers and are exclusively used with the human tags. A customer may define these for most any reason and will typically associate a special optical alert sequence to it. Typical applications would be entering an area of hazard or an area where special equipment must be worn such as safety glasses or hearing protection. Note: it requires a customer specific firmware to associate an optical alarm to these zone encroachments.

A parking zone is an area where forklifts are typically parked between shifts. In this zone, the refresh rate of stationary forklifts is turned down to preserve battery life.

A racking zone is an area where human devices can be stored between shifts. In this zone, the refresh rate is turned down to be quite low to preserve battery life.

The audible alert device in the pedestrian device has three different levels of sound pressure level. The system will automatically send the correct sound level for zones on the shop floor that have differing noise levels. This can individualized to accommodate for individual's differing hearing proficiency on a device-by-device basis.

The exit zone is typically near an exit door to the facility. When a tag enters this, it sends an alert to the human so that they remember to rack their pedestrian device.

The speed governed zone is a static zone where the speed governor relay will be activated to supply power to a third party electronic speed governor or other device of the customer's choice.

Dynamic zones travel with machine tags and grow, shrink, and change shape according to the nature of the motion of the machine as well as where they are located within the facility. Specifically, the size of the zone is based on customer defined variables as well as the speed and acceleration of the machine. The zones are skewed in shape based on speed and projected path and can also expand in size and shape when a machine enters an intersection zone.

Dynamic zones are configured for individual machines as there is a wide variety of machine sizes and shapes and the exact placement of the control module is variable depending on the details of the machine. The system is programmed with defaults which are appropriate for most standard sit-down forklift models.

The red zone represents a zone of potential danger should a human (or human tag) enter the zone. There are five basic red zone types: stationary machine, moving machines, moving machines in a driving aisle, and moving machines in an intersection zone; both of the moving cases are affected by the predicted path of the machine.

Figure 30:
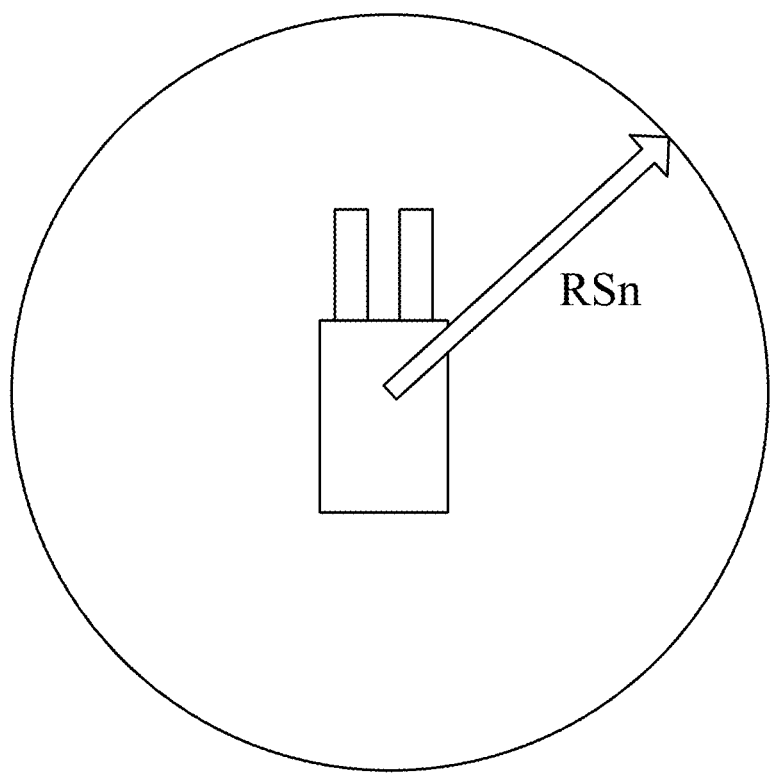
FIG. 30 illustrates an example zone calculation in accordance with aspects of the innovation.

Stationary machines may not have a known orientation, as illustrated in FIG. 30. In this case, the red zone is a simple radius, radius static/orientation not known (RSn) about the tag mounted on the machine; this is a customer designated number in meters. It will be understood that, in aspects, zone calculation can be establishing using the following formula or other formulas:

$$\text{Length of Red Zone} = RSn + f(V)$$

$$V = \text{velocity}$$

$$\text{Length of Yellow Zone} = x * \text{Length of Red Zone}$$

These zones provide for growth in length from the static zone case in a nonlinear arrangement. As will be appreciated, the zones grow slower in the middle velocities and higher velocities to ensure that the zones are appropriately sized in the lower velocities and not too long in the higher velocities.

The dynamic zones around a moving machine are affected by the machine entering an Intersection Zone. Specifically, the dynamic zones will "spider" out to all directions defined by the Intersection Zone until the predicted path starts to curve confidently in one direction. At that time, the dynamic zones will default to their sizes and shapes as defined above.

This red zone is a special case where the moving machine is in a designated driving aisle. For this situation, the red zone encompasses the entire width of the driving aisle. If the machine becomes off center of the driving aisle, it grows the zone to the side of the aisle by the amount that it is off center but continues to include the entire width of the aisle. If the trajectory of the machine starts to project it off the aisle, the zone will skew in the direction of the predicted path as described supra.

The system continuously determines the predicted path of the moving machine by calculating velocity, direction, and acceleration vectors. The dynamic zones will change in shape by keeping the center point of WF on and perpendicular to the projected path.

The yellow zone is an early warning zone that extends the size in its existing shape of the Red Zone on a percentage basis. $F_y$ is a customer defined constant in percentage to factor and extend the size.

Figure 31:
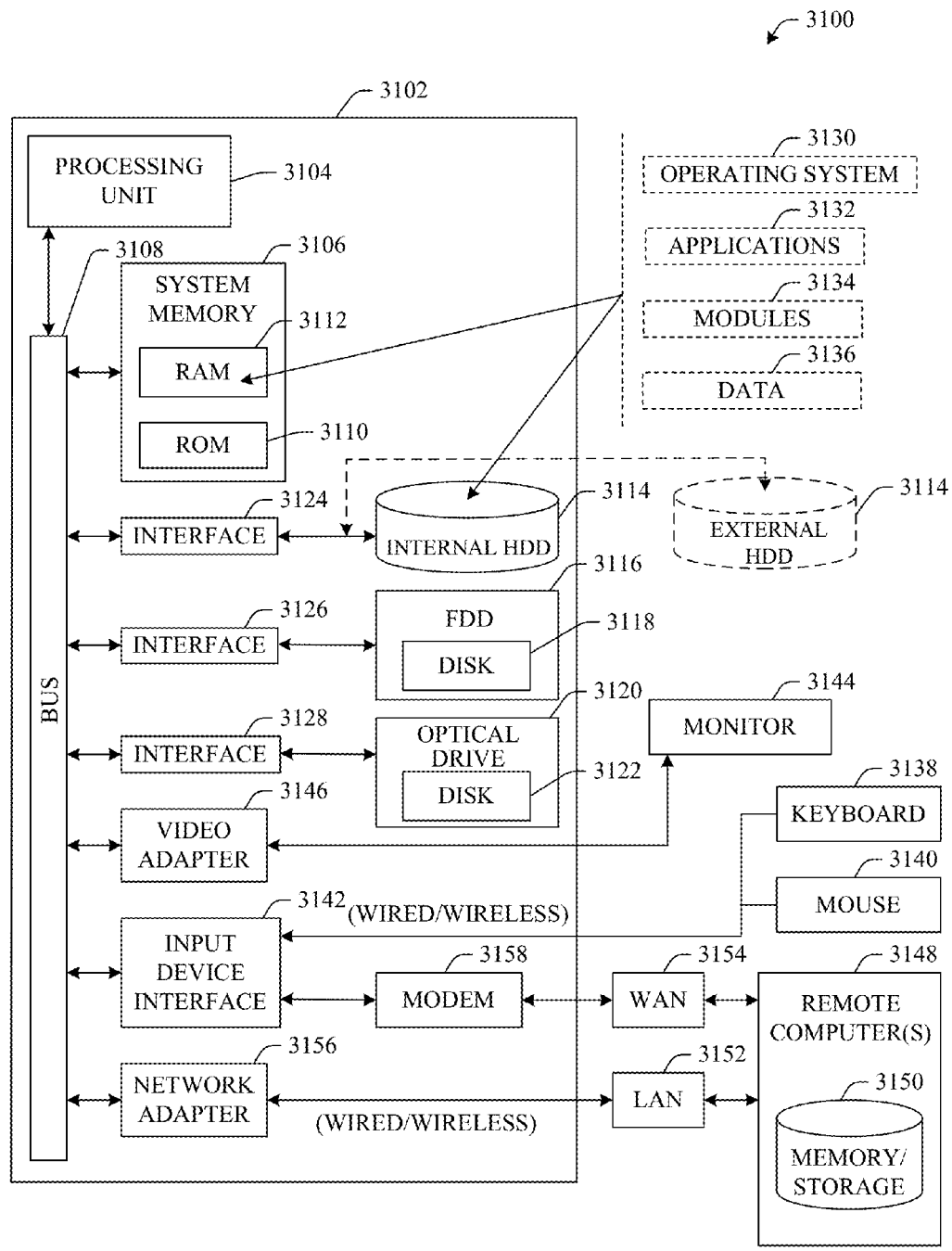
FIG. 31 illustrates a block diagram of a computer operable to execute the disclosed architecture.

Referring now to FIG. 31, there is illustrated a block diagram of a computer operable to execute the disclosed architecture. In order to provide additional context for various aspects of the subject innovation, FIG. 31 and the following discussion are intended to provide a brief, general description of a suitable computing environment 3100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 31, the exemplary environment 3100 for implementing various aspects of the innovation includes a computer 3102, the computer 3102 including a processing unit 3104, a system memory 3106 and a system bus 3108. The system bus 3108 couples system components including, but not limited to, the system memory 3106 to the processing unit 3104. The processing unit 3104 can be any of various commercially available processors. Dual microprocessors and other multi-processor architectures may also be employed as the processing unit 3104.

The system bus 3108 can be any of several types of bus structure that may further interconnect to a memory bus (with or without a memory controller), a peripheral bus, and a local bus using any of a variety of commercially available bus architectures. The system memory 3106 includes read-only memory (ROM) 3110 and random access memory (RAM) 3112. A basic input/output system (BIOS) is stored in a non-volatile memory 3110 such as ROM, EPROM, EEPROM, which BIOS contains the basic routines that help to transfer information between elements within the computer 3102, such as during start-up. The RAM 3112 can also include a high-speed RAM such as static RAM for caching data.

The computer 3102 further includes an internal hard disk drive (HDD) 3114 (e.g., EIDE, SATA), which internal hard disk drive 3114 may also be configured for external use in a suitable chassis (not shown), a magnetic floppy disk drive (FDD) 3116, (e.g., to read from or write to a removable diskette 3118) and an optical disk drive 3120, (e.g., reading a CD-ROM disk 3122 or, to read from or write to other high capacity optical media such as the DVD). The hard disk drive 3114, magnetic disk drive 3116 and optical disk drive 3120 can be connected to the system bus 3108 by a hard disk drive interface 3124, a magnetic disk drive interface 3126 and an optical drive interface 3128, respectively. The interface 3124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 3102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 3112, including an operating system 3130, one or more application programs 3132, other program modules 3134 and program data 3136. All or portions of the operating system, applications, modules, and/or data can also be cached in the RAM 3112. It is appreciated that the innovation can be implemented with various commercially available operating systems or combinations of operating systems.

A user can enter commands and information into the computer 3102 through one or more wired/wireless input devices, e.g., a keyboard 3138 and a pointing device, such as a mouse 3140. Other input devices (not shown) may include a microphone, an IR remote control, a joystick, a game pad, a stylus pen, touch screen, or the like. These and other input devices are often connected to the processing unit 3104 through an input device interface 3142 that is coupled to the system bus 3108, but can be connected by other interfaces, such as a parallel port, an IEEE 1394 serial port, a game port, a USB port, an IR interface, etc.

A monitor 3144 or other type of display device is also connected to the system bus 3108 via an interface, such as a video adapter 3146. In addition to the monitor 3144, a computer typically includes other peripheral output devices (not shown), such as speakers, printers, etc.

The computer 3102 may operate in a networked environment using logical connections via wired and/or wireless communications to one or more remote computers, such as a remote computer(s) 3148. The remote computer(s) 3148 can be a workstation, a server computer, a router, a personal computer, portable computer, microprocessor-based entertainment appliance, a peer device or other common network node, and typically includes many or all of the elements described relative to the computer 3102, although, for purposes of brevity, only a memory/storage device 3150 is illustrated. The logical connections depicted include wired/wireless connectivity to a local area network (LAN) 3152 and/or larger networks, e.g., a wide area network (WAN) 3154. Such LAN and WAN networking environments are commonplace in offices and companies, and facilitate enterprise-wide computer networks, such as intranets, all of which may connect to a global communications network, e.g., the Internet.

When used in a LAN networking environment, the computer 3102 is connected to the local network 3152 through a wired and/or wireless communication network interface or adapter 3156. The adapter 3156 may facilitate wired or wireless communication to the LAN 3152, which may also include a wireless access point disposed thereon for communicating with the wireless adapter 3156.

When used in a WAN networking environment, the computer 3102 can include a modem 3158, or is connected to a communications server on the WAN 3154, or has other means for establishing communications over the WAN 3154, such as by way of the Internet. The modem 3158, which can be internal or external and a wired or wireless device, is connected to the system bus 3108 via the serial port interface 3142. In a networked environment, program modules depicted relative to the computer 3102, or portions thereof, can be stored in the remote memory/storage device 3150. It will be appreciated that the network connections shown are exemplary and other means of establishing a communications link between the computers can be used.

The computer 3102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An event warning system, comprising:
    an application configuration interface that enables identification and definition of one or more zones, wherein each of the zones defines a region within a facility or associated with at least one moveable machine;
    at least one asset;
    a dynamic zone identification component that facilitates the establishment and automatic and real time control of one or more dynamic zones, wherein each dynamic zone is associated with a distinct moveable machine, and wherein a shape and a size of each dynamic zone continuously vary in real time based at least in part on a velocity and a direction of travel of the associated distinct moveable machine and also based at least in part on a proximity to one or more static zones of the distinct moveable machine, wherein the static zones are associated with a fixed area of the facility; and
    an event recognition component that monitors each of the regions in real time and generates a notification based at least in part upon encroachment of one of the assets into one or more zones.

2. The system of claim 1, wherein the event warning system is computer executable.

3. The system of claim 1, wherein the application configuration interface is executable by software.

4. The system of claim 1, wherein the event warning system comprise a real time location system that comprises a plurality of sensors that facilitate identification of the precise location of one or more tag identification components, wherein each tag identification component is associated with an associated asset of the at least one asset within the facility or an associated moveable machine of the at least one moveable machine within the facility, wherein two way radio frequency communication with the tag identification components facilitates two-way data packet communication with the tag identification components and identification of the location of the tag identification components.

5. The system of claim 1, wherein the system receives a verification of an alert sent to an asset or a moveable machine and automatically resends the alert if the verification of the alert is not received by the system.

6. The system of claim 1, wherein the event warning system comprise a static zone identification component that facilitates establishment of one or more static zones overlaid upon the facility and associated with a fixed area of the facility.

7. The system of claim 6, wherein the one or more static zones comprise a protected work zone that allows a worker to enter the region in a "normal" position and to not receive alerts.

8. The system of claim 6, wherein the one or more static zones comprise an intersection zone that causes the dynamic zone identification component to change the size and shape of a first dynamic zone of the one or more dynamic zones to include the static intersection zone when the moveable machine comes in proximity to the static intersection zone.

9. The system of claim 6, further comprising a speed control static zone wherein speed of one or more of the at least one moveable machines can be remotely regulated.

10. The system of claim 6, wherein the one or more static zones comprise a driving aisle zone and the location of a moveable machine within or overlapped to the driving aisle zone causes the dynamic zone identification component to change the shape of the dynamic zone to include at least the full width of the driving aisle zone.

11. The system of claim 6, wherein the one or more static zones comprise a speed limit zone and the presence of a moveable machine within or overlapped to the speed limit zone that is moving at a velocity higher than a designated speed causes the system to send an alert to the moveable machine within or overlapped to the speed limit zone.

12. The system of claim 1, wherein the dynamic zone identification component establishes further automatic and real time control without intervention of an asset of one or more dynamic zones each associated to a moveable machine the shape and size of which is continuously variable in real time based on velocity, acceleration, direction, predicted path or position of the moveable machine.

13. The system of claim 1, further comprising a tag identification component that facilitates association of a unique tag to the asset or moveable machine, wherein the unique tag identifies authorizations, credentials and identity of the asset and wherein the unique tag facilitates generation of the notification.

14. The system of claim 13, further comprising a monitoring component that tracks a plurality of assets in relation to the one or more zones, wherein the monitoring component facilities determination of encroachment on the one or more zones.

15. The system of claim 14, further comprising a pairing component that associates an operator to a paired machine of the at least one moveable machine via tag identification and disables alerts caused by that operator's encroachment to the paired machine and to other machines of the at least one moveable machine while the operator remains in close proximity to the paired machine.

16. The system of claim 1, wherein the event recognition component predicts a zone encroachment of the asset based upon velocity, direction, predicted path or position of the asset.

17. The system of claim 1, wherein the encroachment defines an asset approaching a machine that is stationary and wherein the system facilitates active control of the machine's ignition circuit to disable the machine from moving.

18. The system of claim 1, wherein the notification is one or more of an audible, vibratory or visual notification.

19. The system of claim 1, wherein an alert level of the notification corresponds with a severity of circumstance surrounding the event.

20. A computer-implemented method of event warning, comprising:

employing a processor that executes computer executable instructions stored on a non-transitory computer readable storage medium to implement the following acts:

employing an application configuration interface that enables identification and definition of one or more zones, wherein each of the zones defines a region within a facility or associated with at least one moveable machine;

attaching a tag identification component to each of at least one asset and to each of the at least one moveable machine;

employing a dynamic zone identification component that facilitates the establishment and automatic and real time control without intervention of an asset of one or more dynamic zones, wherein each dynamic zone is associated with a distinct moveable machine, and wherein a shape and a size of each dynamic zone continuously vary in real time based at least in part on a velocity, a direction of travel and a proximity to static zones of the associated distinct moveable machine; and employing an event recognition component that monitors each of the one or more zones in real time based at least in part upon encroachment of one of the assets into one or more zones all to generate a notification based at least in part upon encroachment of one of the one or more zones.

21. The method of claim 20, further comprising employing a real time location system that comprises a plurality of sensors that facilitate identification of the precise location of one or more of the tag identification components, wherein each tag identification component is associated with an associated asset of the at least one asset within the facility or an associated moveable machine of the at least one moveable machine within the facility, wherein two way radio frequency communication with the tag identification components facilitates two-way data packet communication with the tag identification components and identification of the location of the tag identification components.

22. The method of claim 20, further comprising employing a static zone identification component that facilitates establishment of one or more static zones overlaid upon the facility and associated with a fixed area of the facility.

* * * * *